US011463869B2

(12) United States Patent
Abdelghaffar et al.

(10) Patent No.: US 11,463,869 B2
(45) Date of Patent: Oct. 4, 2022

(54) DUAL-MODE HALF DUPLEX TIME DIVISION DUPLEX AND FULL DUPLEX FREQUENCY DIVISION DUPLEX CAPABLE USER EQUIPMENT

(71) Applicant: QUALCOMM Incorporated, San Diego, CA (US)

(72) Inventors: Muhammad Sayed Khairy Abdelghaffar, San Jose, CA (US); Krishna Kiran Mukkavilli, San Diego, CA (US); Joseph Patrick Burke, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/110,410

(22) Filed: Dec. 3, 2020

(65) Prior Publication Data

US 2021/0176626 A1 Jun. 10, 2021

Related U.S. Application Data

(60) Provisional application No. 62/944,986, filed on Dec. 6, 2019.

(51) Int. Cl.
*H04W 8/24* (2009.01)
*H04L 5/16* (2006.01)
*H04W 80/02* (2009.01)
*H04W 76/27* (2018.01)
*H04L 5/14* (2006.01)

(52) U.S. Cl.
CPC ............ *H04W 8/24* (2013.01); *H04L 5/1469* (2013.01); *H04L 5/16* (2013.01); *H04W 76/27* (2018.02); *H04W 80/02* (2013.01)

(58) Field of Classification Search
None
See application file for complete search history.

(56) References Cited

U.S. PATENT DOCUMENTS 10,389,512 B2 * 8/2019 Takeda ................ H04W 72/042
2013/0188536 A1 7/2013 Pirskanen et al.
(Continued)

OTHER PUBLICATIONS

International Search Report and Written Opinion—PCT/US2020/063293—ISA/EPO—dated Mar. 3, 2021.
(Continued)

*Primary Examiner* — Anh Vu H Ly
(74) *Attorney, Agent, or Firm* — Holland & Hart LLP/Qualcomm Incorporated

(57) ABSTRACT

Methods, systems, and devices for wireless communications are described. A user equipment (UE) may identify a multi-mode capability for communications by the UE within a frequency band, such that that UE may be capable of operating in any one of a half duplex time division duplex (TDD) mode and a full duplex frequency division duplex (FDD) mode within the frequency band. The UE may then transmit an indication of the multi-mode capability to a base station. The UE may receive, from the base station and responsive to the transmission of the indication, a communication format configuration that includes a partitioning between TDD mode communications and FDD mode communications for the frequency band.

28 Claims, 21 Drawing Sheets

(56) References Cited

U.S. PATENT DOCUMENTS

| | | | |
|---|---|---|---|
| 2015/0372801 A1* | 12/2015 | Smee | H04W 72/048 |
| | | | 370/296 |
| 2017/0019243 A1* | 1/2017 | Ahn | H04L 5/001 |
| 2017/0195028 A1* | 7/2017 | Shimezawa | H04L 1/0026 |
| 2017/0367073 A1 | 12/2017 | Murugan et al. | |
| 2018/0212746 A1* | 7/2018 | Kazmi | H04L 1/1825 |
| 2019/0045397 A1 | 2/2019 | Mueck et al. | |
| 2019/0159086 A1* | 5/2019 | Xu | H04W 36/08 |
| 2021/0336667 A1* | 10/2021 | Bengtsson | H04B 7/0469 |

OTHER PUBLICATIONS

Qualcomm Incorporated: "XDD-FRX Capability Signaling," 3GPP Draft, 3GPP TSG RAN WG1 #99, R1-1912931, 3rd Generation Partnership Project (3GPP), Mobile Competence Centre, 650, Route Des Lucioles, F-06921, Sophia-Antipolis Cedex, France, vol. RAN WG1. No. Reno. NV. USA, Nov. 18, 2019-Nov. 22, 2019, Nov. 9, 2019 (Nov. 9, 2019), XP051823694, pp. 1-4, Retrieved from the Internet: URL: https://ftp.3gpp.org/tsg_ran/WG1_RL1/TSGR1_99/Docs/R1-1912931.zip R1-1912931 XDD-FRX capability signaling. docx [retrieved on Nov. 9, 2019] the whole document.

* cited by examiner

DUAL-MODE HALF DUPLEX TIME DIVISION DUPLEX AND FULL DUPLEX FREQUENCY DIVISION DUPLEX CAPABLE USER EQUIPMENT

CROSS REFERENCE

The present application for patent claims the benefit of U.S. Provisional Patent Application No. 62/944,986 by Abdelghaffar et al., entitled "DUAL-MODE HALF DUPLEX TIME DIVISION DUPLEX AND FULL DUPLEX FREQUENCY DIVISION DUPLEX CAPABLE USER EQUIPMENT," filed Dec. 6, 2019, assigned to the assignee hereof, and expressly incorporated by reference in its entirety herein.

FIELD OF TECHNOLOGY

The following relates generally to wireless communications and more specifically to dual-mode half duplex time division duplex (TDD) and full duplex frequency division duplex (FDD) capable user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate in a wireless communications system using a particular operating band (e.g., in a NR operating band) using a time division duplex (TDD) mode configuration or a frequency division duplex (FDD) mode configuration. However, using an operating band using only TDD or FDD may lead to inefficient communications and inefficiently utilized resources.

SUMMARY

The described techniques relate to improved methods, systems, devices, and apparatuses that support dual-mode half duplex time division duplex (TDD) and full duplex frequency division duplex (FDD) capable user equipment (UE). Generally, the described techniques provide for communication by multi-mode operational UEs of multi-mode capabilities to one or more base stations. For example, a UE may identify a multi-mode capability for communications by the UE within a frequency band, such that the UE may be capable of operating in any one of a half duplex TDD mode and a full duplex FDD mode within the frequency band. The UE may then transmit an indication of the multi-mode capability to a base station. The UE may receive, from the base station and responsive to the transmission of the indication, a communication format configuration that includes a partitioning between TDD mode communications and FDD mode communications for the frequency band.

A method of wireless communication at a UE is described. The method may include identifying a multi-mode capability for communications by the UE within a frequency band such that the UE is capable of operating in any one of a half duplex TDD mode and a full duplex FDD mode within the frequency band, transmitting an indication of the multi-mode capability to a base station, and receiving, responsive to transmission of the indication, a communication format configuration that includes a partitioning between TDD mode communications and FDD mode communications for the frequency band.

An apparatus for wireless communication at a UE is described. The apparatus may include a processor, memory coupled with the processor, and instructions stored in the memory. The instructions may be executable by the processor to cause the apparatus to identify a multi-mode capability for communications by the UE within a frequency band such that the UE is capable of operating in any one of a half duplex TDD mode and a full duplex FDD mode within the frequency band, transmit an indication of the multi-mode capability to a base station, and receive, responsive to transmission of the indication, a communication format configuration that includes a partitioning between TDD mode communications and FDD mode communications for the frequency band.

Another apparatus for wireless communication at a UE is described. The apparatus may include means for identifying a multi-mode capability for communications by the UE within a frequency band such that the UE is capable of operating in any one of a half duplex TDD mode and a full duplex FDD mode within the frequency band, transmitting an indication of the multi-mode capability to a base station, and receiving, responsive to transmission of the indication, a communication format configuration that includes a partitioning between TDD mode communications and FDD mode communications for the frequency band.

A non-transitory computer-readable medium storing code for wireless communication at a UE is described. The code may include instructions executable by a processor to identify a multi-mode capability for communications by the UE within a frequency band such that the UE is capable of operating in any one of a half duplex TDD mode and a full duplex FDD mode within the frequency band, transmit an indication of the multi-mode capability to a base station, and receive, responsive to transmission of the indication, a communication format configuration that includes a partitioning between TDD mode communications and FDD mode communications for the frequency band.

In some examples of the method, apparatuses, and non-transitory computer-readable medium described herein, transmitting the indication of the multi-mode capability may include operations, features, means, or instructions for transmitting the indication to the base station during an initial registration process in a radio resource control (RRC) message.

In some examples of the method, apparatuses, and non-transitory computer-readable medium described herein, receiving the communication format configuration may include operations, features, means, or instructions for receiving the communication format configuration via a radio resource control message, where the communication format configuration may be static or semi-static.

In some examples of the method, apparatuses, and non-transitory computer-readable medium described herein, receiving the communication format configuration may include operations, features, means, or instructions for receiving the communication format configuration via a downlink control information message or a medium access control (MAC) control element (CE) message.

In some examples of the method, apparatuses, and non-transitory computer-readable medium described herein, the communication format configuration may be an update for a previously received communication format configuration.

In some examples of the method, apparatuses, and non-transitory computer-readable medium described herein, identifying that the UE may have the multi-mode capability may include operations, features, means, or instructions for identifying that the multi-mode capability of the UE includes the UE being capable of operating in any one of the half duplex TDD mode and the full duplex FDD mode within only a portion of the frequency band or within an entirety of the frequency band.

Some examples of the method, apparatuses, and non-transitory computer-readable medium described herein may further include operations, features, means, or instructions for identifying a switching time capability for the UE to switch between half duplex TDD mode operations and full duplex FDD mode operations, and indicating the switching time capability to the base station.

In some examples of the method, apparatuses, and non-transitory computer-readable medium described herein, the communication format configuration includes a guard time between TDD mode communications and FDD mode communications that satisfies the switching time capability of the UE.

In some examples of the method, apparatuses, and non-transitory computer-readable medium described herein, the switching time capability may be indicated as a number of symbols and may be numerology-specific.

In some examples of the method, apparatuses, and non-transitory computer-readable medium described herein, the switching time capability may be indicated as a fixed unit of time.

In some examples of the method, apparatuses, and non-transitory computer-readable medium described herein, the communication format configuration includes a slot format partitioning or a subframe format partitioning or radio frame partitioning between TDD mode communications and FDD mode communications for the frequency band.

In some examples of the method, apparatuses, and non-transitory computer-readable medium described herein, the communication format configuration includes partitioning between one or more of a set of communication formats.

In some examples of the method, apparatuses, and non-transitory computer-readable medium described herein, the set of communication formats includes a TDD format.

In some examples of the method, apparatuses, and non-transitory computer-readable medium described herein, the set of communication formats includes a TDD mixed format that includes simultaneous TDD and FDD formats within the frequency band, where the frequency band may be a TDD band.

In some examples of the method, apparatuses, and non-transitory computer-readable medium described herein, the set of communication formats includes a mixed format that includes simultaneous TDD and FDD formats within the frequency band.

In some examples of the method, apparatuses, and non-transitory computer-readable medium described herein, the set of communication formats includes multiple FDD formats within the frequency band.

In some examples of the method, apparatuses, and non-transitory computer-readable medium described herein, receiving the communication format configuration may include operations, features, means, or instructions for receiving an operating band indication, where the operating band indication may be associated with the frequency band, and where the frequency band and the operating band indication may be not reserved for TDD operation only or for FDD operation only.

A method of wireless communication at a base station is described. The method may include receiving, from a UE, a first indication of a multi-mode capability for communications by the UE within a frequency band such that the UE is capable of operating in any one of a half duplex TDD mode and a full duplex FDD mode within the frequency band, determining, based on the first indication, a communication format configuration for the UE that includes a partitioning between TDD mode communications and FDD mode communications for the frequency band, and transmitting to the UE a second indication which is indicative of the communication format configuration to be used by the UE in communicating with the base station.

An apparatus for wireless communication at a base station is described. The apparatus may include a processor, memory coupled with the processor, and instructions stored in the memory. The instructions may be executable by the processor to cause the apparatus to receive, from a UE, a first indication of a multi-mode capability for communications by the UE within a frequency band such that the UE is capable of operating in any one of a half duplex TDD mode and a full duplex FDD mode within the frequency band, determine, based on the first indication, a communication format configuration for the UE that includes a partitioning between TDD mode communications and FDD mode communications for the frequency band, and transmit to the UE a second indication which is indicative of the communication format configuration to be used by the UE in communicating with the base station.

Another apparatus for wireless communication at a base station is described. The apparatus may include means for receiving, from a UE, a first indication of a multi-mode capability for communications by the UE within a frequency band such that the UE is capable of operating in any one of a half duplex TDD mode and a full duplex FDD mode within the frequency band, determining, based on the first indication, a communication format configuration for the UE that includes a partitioning between TDD mode communications and FDD mode communications for the frequency band, and transmitting to the UE a second indication which is indicative of the communication format configuration to be used by the UE in communicating with the base station.

A non-transitory computer-readable medium storing code for wireless communication at a base station is described. The code may include instructions executable by a processor to receive, from a UE, a first indication of a multi-mode capability for communications by the UE within a frequency band such that the UE is capable of operating in any one of a half duplex TDD mode and a full duplex FDD mode within the frequency band, determine, based on the first indication, a communication format configuration for the UE that includes a partitioning between TDD mode communications and FDD mode communications for the frequency band, and transmit to the UE a second indication which is indicative of the communication format configuration to be used by the UE in communicating with the base station.

Some examples of the method, apparatuses, and non-transitory computer-readable medium described herein may further include operations, features, means, or instructions for receiving a set of first indications from the set of UEs, where the communication format configuration may be determined based on the set of first indications.

In some examples of the method, apparatuses, and non-transitory computer-readable medium described herein, receiving the first indication of the multi-mode capability may include operations, features, means, or instructions for receiving the first indication from the UE during an initial registration process in a RRC message.

In some examples of the method, apparatuses, and non-transitory computer-readable medium described herein, transmitting the second indication which may be indicative of the communication format configuration may include operations, features, means, or instructions for transmitting the second indication via a radio resource control message, where the communication format configuration may be static or semi-static.

In some examples of the method, apparatuses, and non-transitory computer-readable medium described herein, transmitting the second indication which may be indicative of the communication format configuration may include operations, features, means, or instructions for transmitting the second indication via a downlink control information message or a medium access control (MAC) control element (CE) message.

In some examples of the method, apparatuses, and non-transitory computer-readable medium described herein, the communication format configuration may be an update for a previously transmitted communication format configuration.

Some examples of the method, apparatuses, and non-transitory computer-readable medium described herein may further include operations, features, means, or instructions for receiving, from the UE, a switching time capability for the UE to switch between half duplex TDD mode operations and full duplex FDD mode operations, where the communication format configuration may be determined based on the switching time capability of the UE.

In some examples of the method, apparatuses, and non-transitory computer-readable medium described herein, the communication format configuration includes a guard time between TDD mode communications and FDD mode communications that satisfies the switching time capability of the UE.

In some examples of the method, apparatuses, and non-transitory computer-readable medium described herein, the switching time capability may be indicated as a number of symbols and may be numerology-specific.

In some examples of the method, apparatuses, and non-transitory computer-readable medium described herein, the switching time capability may be indicated as a fixed unit of time.

In some examples of the method, apparatuses, and non-transitory computer-readable medium described herein, the communication format configuration includes a slot format partitioning or a subframe format partitioning or radio frame partitioning between TDD mode communications and FDD mode communications for the frequency band.

In some examples of the method, apparatuses, and non-transitory computer-readable medium described herein, the communication format configuration includes partitioning between one or more of a set of communication formats.

In some examples of the method, apparatuses, and non-transitory computer-readable medium described herein, the set of communication formats includes a TDD format.

In some examples of the method, apparatuses, and non-transitory computer-readable medium described herein, the set of communication formats includes a TDD mixed format that includes simultaneous TDD and FDD formats within the frequency band, where the frequency band may be a TDD band.

In some examples of the method, apparatuses, and non-transitory computer-readable medium described herein, the set of communication formats includes a mixed format that includes simultaneous TDD and FDD formats within the frequency band.

In some examples of the method, apparatuses, and non-transitory computer-readable medium described herein, the set of communication formats includes multiple FDD formats within the frequency band.

In some examples of the method, apparatuses, and non-transitory computer-readable medium described herein, transmitting the second indication which may be indicative of the communication format configuration may include operations, features, means, or instructions for transmitting an operating band indication, where the operating band indication may be associated with the frequency band, and where the frequency band and the operating band indication may be not reserved for TDD operation only or for FDD operation only.

DETAILED DESCRIPTION

Figure 1:
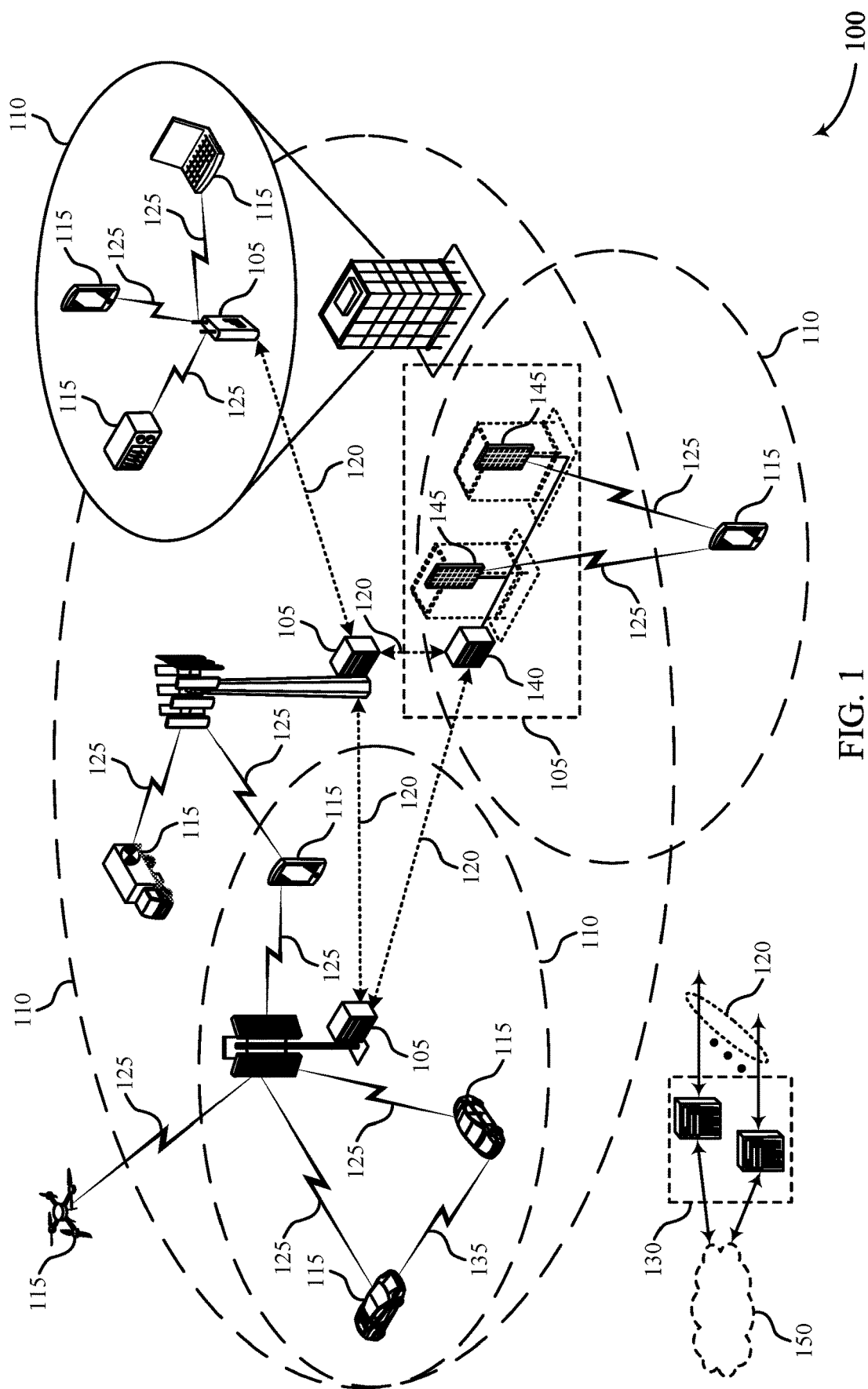
FIG. 1 illustrates an example of a system for wireless communications that supports dual-mode half duplex time division duplex (TDD) and full duplex frequency division duplex (FDD) capable user equipment (UE) in accordance with aspects of the present disclosure.

A UE may operate in a wireless communications system using both paired spectrum configurations and unpaired spectrum configurations. Paired spectrum configurations may include frequency division duplex (FDD) mode frequency bands, and unpaired spectrum configurations may include time division duplex (TDD) mode frequency bands. Some frequency band configurations may include sub-band full duplex configurations. Sub-band full duplex configurations may include partitioning of component carrier (CC) bandwidths into uplink bandwidths and downlink bandwidths. This may include an FDD mode within a CC bandwidth of the TDD spectrum.

In a sub-band full duplex frequency configuration, the base station may be capable of full duplex communications while the UE may operate using a half duplex configuration (e.g., either operating on uplink channels or downlink channels, but not both) or the UE may be in full duplex mode, where the UE may simultaneously transmit and receive in a same frequency band.

A sub-band full duplex frequency configuration may only be one type of spectrum configuration available for use by a UE or base station. The frequency spectrum may be utilized by the network in a number of different modes. Some modes may include a legacy TDD mode, a proposed TDD mode with a mix of legacy slot allocation and sub-band full duplex slot allocations, a combination of TDD (either legacy or mixed) mode and unpaired FDD mode, multiple FDD channels within the band, or other options.

In order to allow for greater flexibility in the signaling and use of these different modes, a UE may declare a multi-mode capability for each band (e.g., New Radio (NR) band) where the UE may signal to one or more base stations that the UE may operate or is capable of operating in different modes. For example, the UE may declare that it may operate in half duplex TDD mode for all or part on a frequency band, or the UE may declare to a base station that it may operate in full duplex FDD modes within the frequency band (e.g., within the NR frequency band). Based on the UE declaration (as well as the declarations of other UEs communicating with the base station), the base station may determine an appropriate slot format or frame format to be used by the UE, including any one of the configurations identified herein.

The UE may also be able to switch between TDD and FDD. The UE may declare a capability to switch between modes, and may transmit an indication of the capability to the network via one or more base stations. The UE may declare the capability by declaring the guard time to switch from the TDD mode to the FDD mode. The guard time may be represented by a number of symbols for different numerologies. The guard time may also be a fixed time (e.g., in units of microseconds (μs)).

After receiving the indication of UE capability, the base station may inform the UE of a slot format or a subframe format or radio format that partitions between TDD and FDD modes. The base station may inform the UE of a static slot format or subframe format or radio format by signaling the format in a radio resource control (RRC) configuration message. The base station may also reconfigure the RRC configured format dynamically via downlink control information (DCI) signaling or in a medium access control (MAC) control element (CE) (MAC-CE).

Aspects of the disclosure are initially described in the context of wireless communications systems. Aspects of the disclosure are then described with respect to spectrum configurations and process flows. Aspects of the disclosure are further illustrated by and described with reference to apparatus diagrams, system diagrams, and flowcharts that relate to dual-mode half duplex TDD and full duplex FDD capable UE.

FIG. 1 illustrates an example of a wireless communications system 100 that supports dual-mode half duplex TDD and full duplex FDD capable UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier. Full duplex communications (e.g., a mode that supports two-way communication via transmission and reception simultaneously) may also be supported.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmissions (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify a multi-mode capability for communications by the UE 115 within a frequency band, such that that UE 115 may be capable of operating in any one of a half duplex TDD mode and a full duplex FDD mode within the frequency band. The UE 115 may then transmit an indication of the multi-mode capability to a base station 105. The UE 115 may receive, from the base station 105 and responsive to the transmission of the indication, a communication format configuration that includes a partitioning between TDD mode communications and FDD mode communications for the frequency band.

Figure 2A:
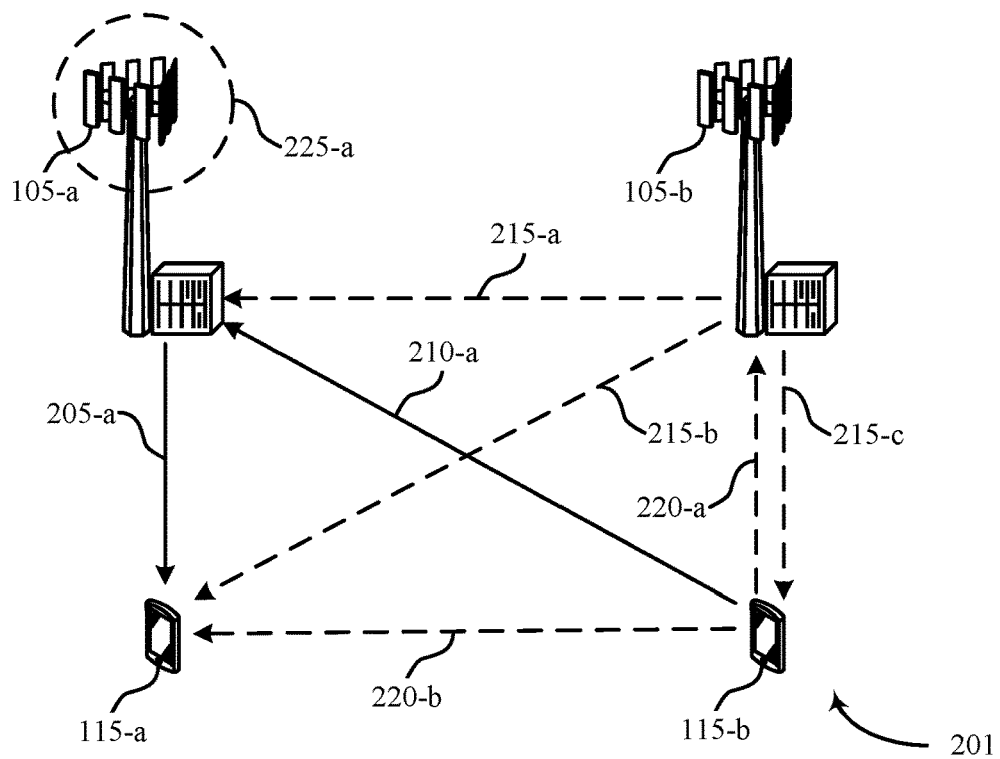
FIGS. 2A and 2B illustrate examples of wireless communications systems that support dual-mode half duplex TDD and full duplex FDD capable UE in accordance with aspects of the present disclosure.
Figure 2B:
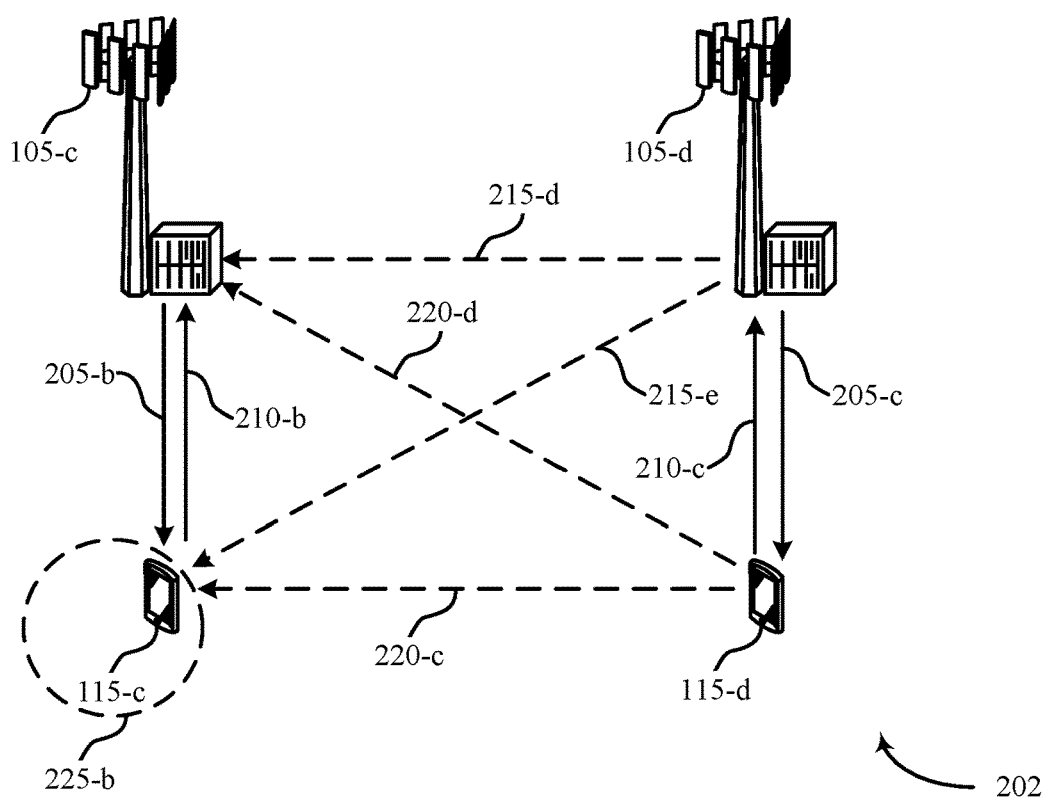

FIGS. 2A and 2B illustrate examples of wireless communications system 201 and 202 that support dual-mode half duplex TDD and full duplex FDD capable UE in accordance with aspects of the present disclosure. In some examples, wireless communications systems 201 and 202 may implement aspects of wireless communication system 100. Wireless communications system 201 may be an example of communications between one or more base stations 105 and one or more UEs 115, in a case where the base stations 105 operate in a full duplex mode and UEs 115 operate in a half duplex mode.

Base station 105-a may operate in full duplex-mode, and may transmit downlink communications 205-a to UE 115-a, and receive uplink communications 210-a from UE 115-b at overlapping times (e.g., as part of TDD communications). Base station 105-a may therefore also experience self-interference 225-a from transmitting downlink communications 205-a and also receiving uplink communications 210-a.

Base station 105-a may also be subject to interference 215-a due to transmissions to and from base station 105-b. Base station 105-b may also cause interference 215-b to UE 115-a. UE 115-b may cause interference 220-b to UE 115-a, as well as interference 220-a to base station 105-b. Base station 105-b may also cause interference 215-c to UE 115-b.

Wireless communication system 202 may be an example of communications between one or more base stations 105 and one or more UEs 115, in a case where the base stations 105 may operate in a full duplex mode and the UEs 115 may also operate in a full duplex mode. Base station 105-c may transmit downlink communications 205-b to UE 115-c, and also receive uplink communications 210-b from UE 115-c. UE 115-c may cause self-interference 225-b based on transmitting uplink communications 210-b and simultaneously receiving downlink communications 205-b as part of a full duplex configuration. Base station 105-d may transmit downlink communications 205-b to UE 115-d, and UE 115-d may also transmit uplink communications to base station 105-d and also receive downlink communications 205-c to base station 105-d. Base station 105-d may cause interference 215-d to base station 105-c, as well as interference 215-e to UE 115-c. UE 115-d may cause interference 220-d to base station 105-c and interference 220-c to UE 115-c.

In either wireless communication system 201 or 202, a UE 115 may communicate an indication of the UE 115 capability to communicate in a particular communication mode, or a capability to switch between different communication modes. One or more base stations may determine a communication mode for the UE 115 to use. The determination by the base station may be based on the interference 215, 220, and 225 experienced by UEs 115 and base stations 105. The base station 105 may determine communication modes in order to mitigate this interference.

Figure 3:
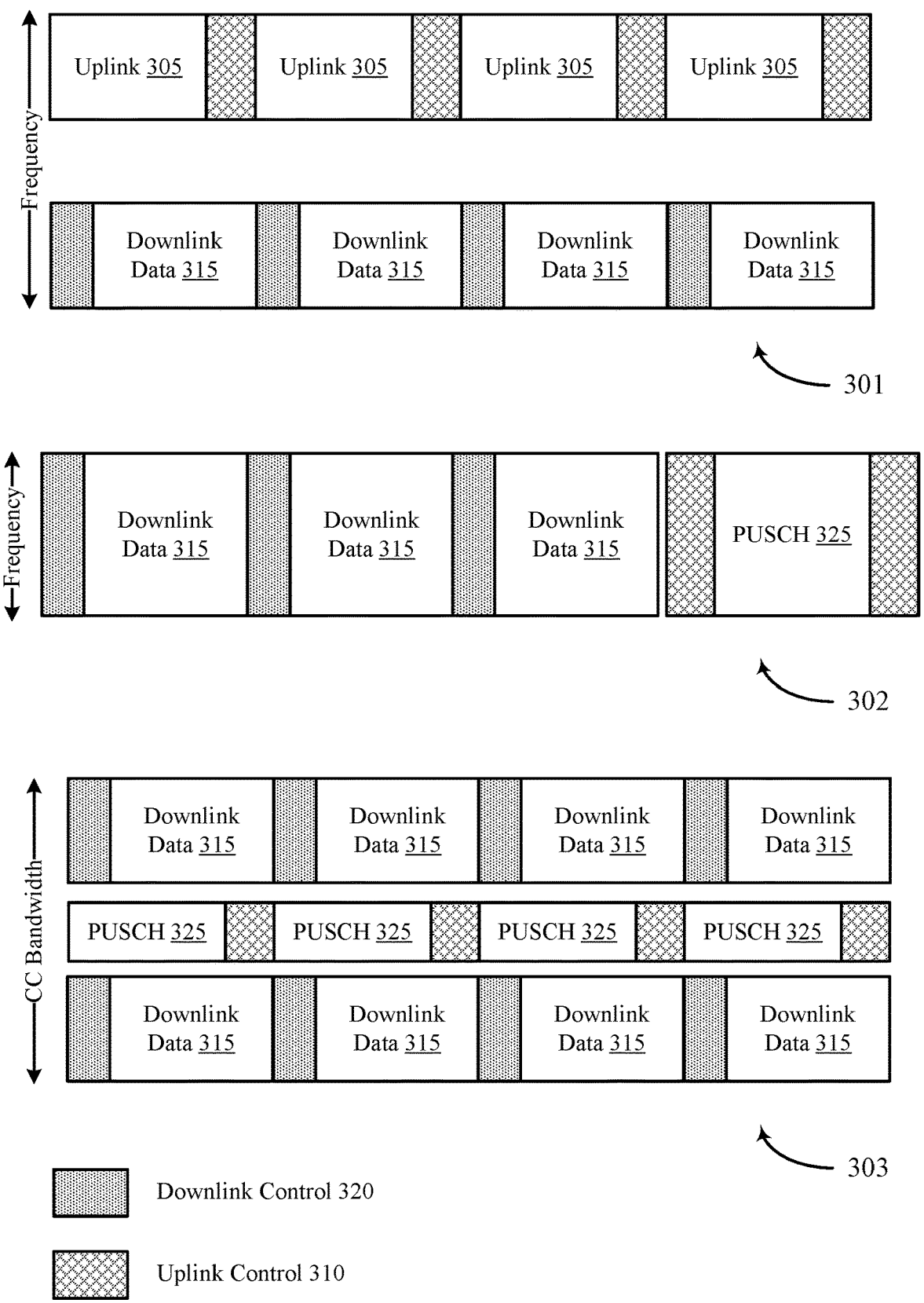
FIG. 3 illustrates an example of spectrum configurations that support dual-mode half duplex TDD and full duplex FDD capable UE in accordance with aspects of the present disclosure.

FIG. 3 illustrates an example of spectrum configurations 301, 302, and 303 that support dual-mode half duplex TDD and full duplex FDD capable UE in accordance with aspects of the present disclosure. In some examples, spectrum configurations 301, 302, and 303 may implement aspects of wireless communication system 100. A UE 115 as described with reference to wireless communications systems 100, 201, and 202 may communicate with a base station 105 according to one or more the spectrum configurations 301, 302, and 303. Spectrum configurations 301 and 302 may illustrate legacy modes of spectrum configurations that a UE 115 may use to communicate with a base station 105. Spectrum configuration 303 may illustrate an example of a legacy sub-band full duplex (SBFD) unpaired TDD spectrum configuration that a UE 115 may use to communicate with a base station 105. A UE 115 may indicate to a base station 105 a capability to communicate in one or more of spectrum configurations 301, 302, and 303. A UE 115 may also indicate an ability to switch between communicating based on spectrum configurations 301, 302, and 303.

Spectrum configuration 301 may illustrate an example of resource allocations in a frequency bandwidth in a paired FDD spectrum. In this case, one portion of the CC bandwidth may be allocated up uplink communications, which may include uplink slots 305 duplexed in time with uplink control slots 310. Another portion of the frequency bandwidth may be allocated for downlink communications. The downlink communication portion may include downlink data TTIs 315 duplexed in time with downlink control slots 320.

Spectrum configuration 302 may illustrate an example of resource allocations in a frequency bandwidth in an unpaired TDD mode configuration. In this case, a first set of downlink slots may be allocated for the entire frequency bandwidth. The first set of downlink slots may include downlink data TTIs 315 duplexed in time with downlink control slots 320. Following the first set of downlink slots may be a set of uplink slots. The set of uplink slots may include physical uplink shared channel (PUSCH) slots 325 duplexed in time with uplink slots 305.

Spectrum configuration 303 may illustrate separate partitioning of a CC BW into uplink bandwidths and downlink bandwidths. For example, the uplink portion of the spectrum configuration may include PUSCH slots 325 and uplink control slots 310. The uplink portion (including PUSCH slots 325 and uplink control slots 310) may be allocated for 20 MHz of frequency bandwidth, in the mid-band of the CC. The downlink portion of the spectrum, including downlink data TTIs 315 and downlink control TTIs 320, may be allocated for 80 MHz. The 80 MHz of downlink allocation may be split into two portions of downlink frequencies of 40 MHz each. Each 40 MHz downlink frequency allocation may be configured for the outside frequency bands of the CC bandwidth. There may be a guard band between the uplink portions of the CC bandwidth and the downlink portions of the CC bandwidth.

This full duplex configuration as illustrated in spectrum configuration 303 may enable an always-on uplink operation, which may allow for increased efficiency for high value applications, such as ultra-reliable low-latency communications (URLLC). In this configuration, a base station 105 may be capable of full duplex communications at all times, and one or more served UEs 115 may be in half duplex mode (either configured for half duplex uplink communications or half duplex downlink communications). One or more UEs 115 may also be in a full duplex mode, where the UE 115 may simultaneously transmit and receive in the TDD band of the CC bandwidth.

Whether a UE 115 is in half duplex or full duplex mode may depend on the capabilities of the UE 115. A UE 115 may determine its multi-mode capability and then information or declare this capability to one or more base stations 105. For example, a UE 115 may determine that is may operate in both a half duplex TDD mode for a whole part of a CC bandwidth (e.g., a NR band), or that the UE 115 may operate in a full duplex FDD mode within the CC bandwidth, or both. A UE 115 may indicate this determined capability to a base station 105. The base station 105 may then determine an operating mode for the UE 115 including a communication configuration based on the UE 115 capability.

Figure 4:
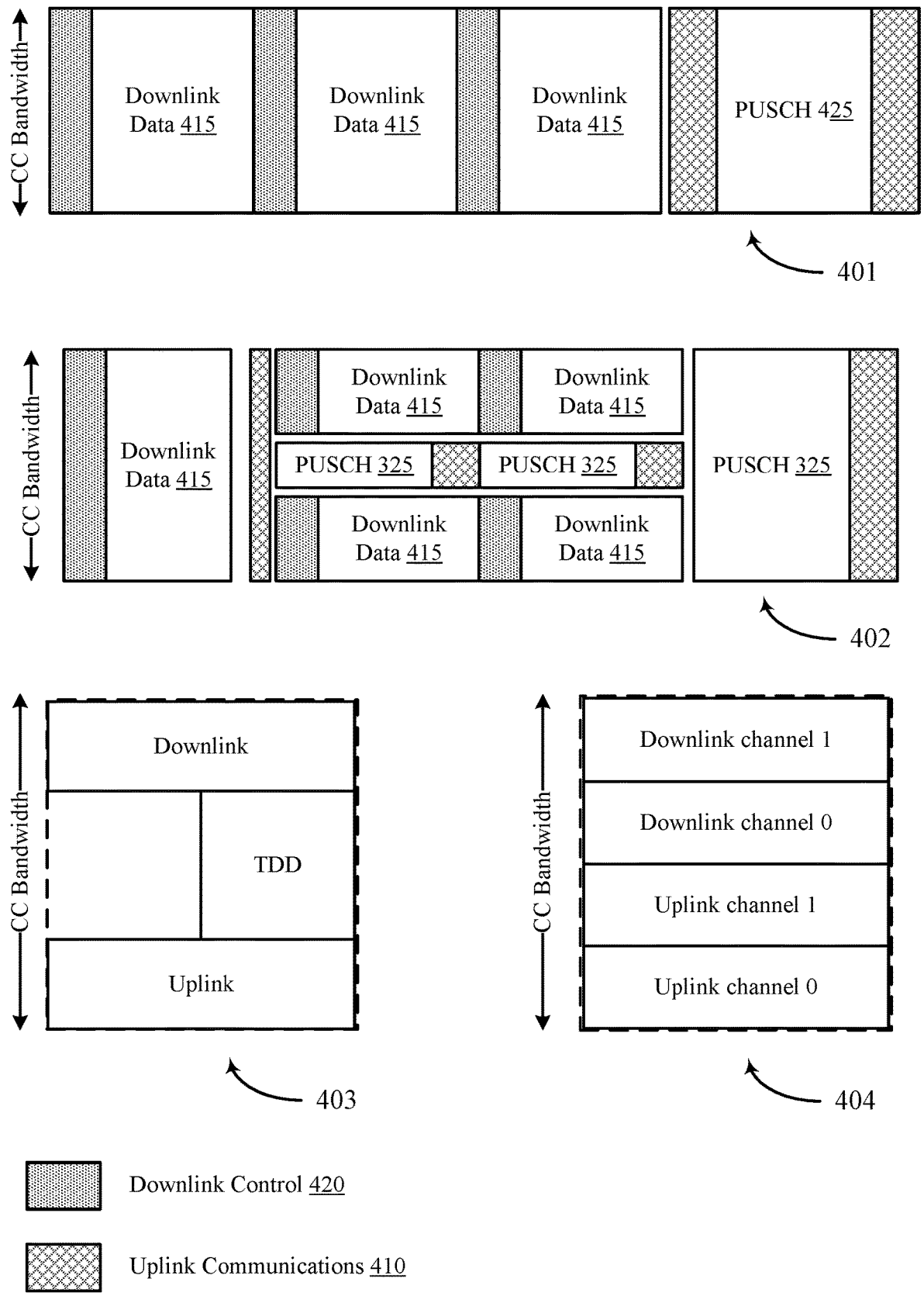
FIG. 4 illustrates an example of spectrum configurations that support dual-mode half duplex TDD and full duplex FDD capable UE in accordance with aspects of the present disclosure.

FIG. 4 illustrates example of spectrum configurations 401, 402, 403, and 404 that support dual-mode half duplex TDD and full duplex FDD capable UE in accordance with aspects of the present disclosure. In some examples, spectrum configurations 401, 402, 403, and 404 may implement aspects of wireless communication system 100, 201, and 202. Spectrum configurations 401, 402, 403, and 404 may be determined by a base station 105 based on a receive indication of capabilities of one or more UEs 115. Base station 105 may transmit an indication of a communication configuration mode (e.g., one or more of spectrum configuration 401, 402,403, and 404) to the one or more UEs 115. The one or more UEs 115 may then communicate based on the received communication configuration The frequency spectrum band (e.g., an NR frequency band), may be configured by the network in different communication modes. For example, spectrum configuration 401 may be an example of a legacy TDD mode. Spectrum configuration 402 may be an example of a TDD configuration with a combination of both legacy TDD slots and SBFD slots. Spectrum configuration 403 may be an example of a combination of TDD configurations and unpaired FDD configurations. Spectrum configuration 404 may be an example of a spectrum configuration with multiple different FDD channels within a CC bandwidth.

Spectrum configuration 401 may be an example of a legacy TDD mode spectrum configuration, where a number of different slot times are duplexed in time, and are each allocated for the available CC bandwidth. Spectrum configuration 401 may include downlink control slots 420 alternating with downlink data slots 415. Downlink control slots 420 and downlink data slots 415 may alternate in terms of time, and both downlink control slots 320 and downlink data slots 415 may cover the entire CC bandwidth. After a particular number of alternating downlink control slots 420 and downlink data slots 415, there may be an allocated uplink slot 405 that is allocated for the entire CC bandwidth, followed by a PUSCH slot 425, and another uplink slot 405. There may be more subsequent uplink slots (e.g., alternating PUSCH slots 425 and uplink slots 405). This configuration may be one example of a legacy TDD spectrum configuration, however different slot patterns may also be used in a legacy TDD spectrum configuration.

Spectrum configuration 402 may be an example of a TDD mode configuration, including legacy TDD configurated combined with unpaired FDD mode configurations. For example, spectrum configuration 402 may include a downlink control slot 420, followed by a downlink data slot 415. Downlink control slot 420 and downlink data slot 415 may be duplexed in time. Next, there may be an uplink slot 405 duplexed in time, followed by a set of downlink control slots 420 and downlink data slots 415 that are duplexed in time but do not use the entire CC bandwidth. This set of downlink control slots and downlink data slots that are duplexed in time may be duplexed in frequency with another set of downlink control and data slots, which may also be duplexed in frequency with a set of PUSCH slots 425 and uplink slots 405. Following this combination of frequency duplexing and time duplexing, there may be a set of PUSCH slots 425 and uplink slots 405 that are duplexed in time with the other slots in this configuration.

Spectrum configuration 403 may be an example of a spectrum configuration with a combination of TDD and unpaired FDD frequency configurations. Spectrum configuration 403 may show an example with a downlink slot section duplexed in frequency with a TDD slot section and an uplink slot section. The TDD slot section may include a TDD configuration as shown in spectrum configuration 401 or 402, or another TDD configuration.

Spectrum configuration 404 may be an example of a spectrum configuration with allocations for multiple FDD channels with the CC bandwidth. For example, the spectrum configuration 404 may show frequency duplexed slot configurations, with a slot section for downlink communications for a first channel (e.g., channel 1), a slot section for downlink communications on a second channel (e.g., channel 0), a slot section for uplink communications on a first channel (e.g., channel 1), and a slot section for uplink communication on a second channel (e.g., channel 0).

Any of spectrum configurations 401, 402, 403, and 404, or a combination may be communicated by a base station 105 to one or more UEs 115.

Figure 5:
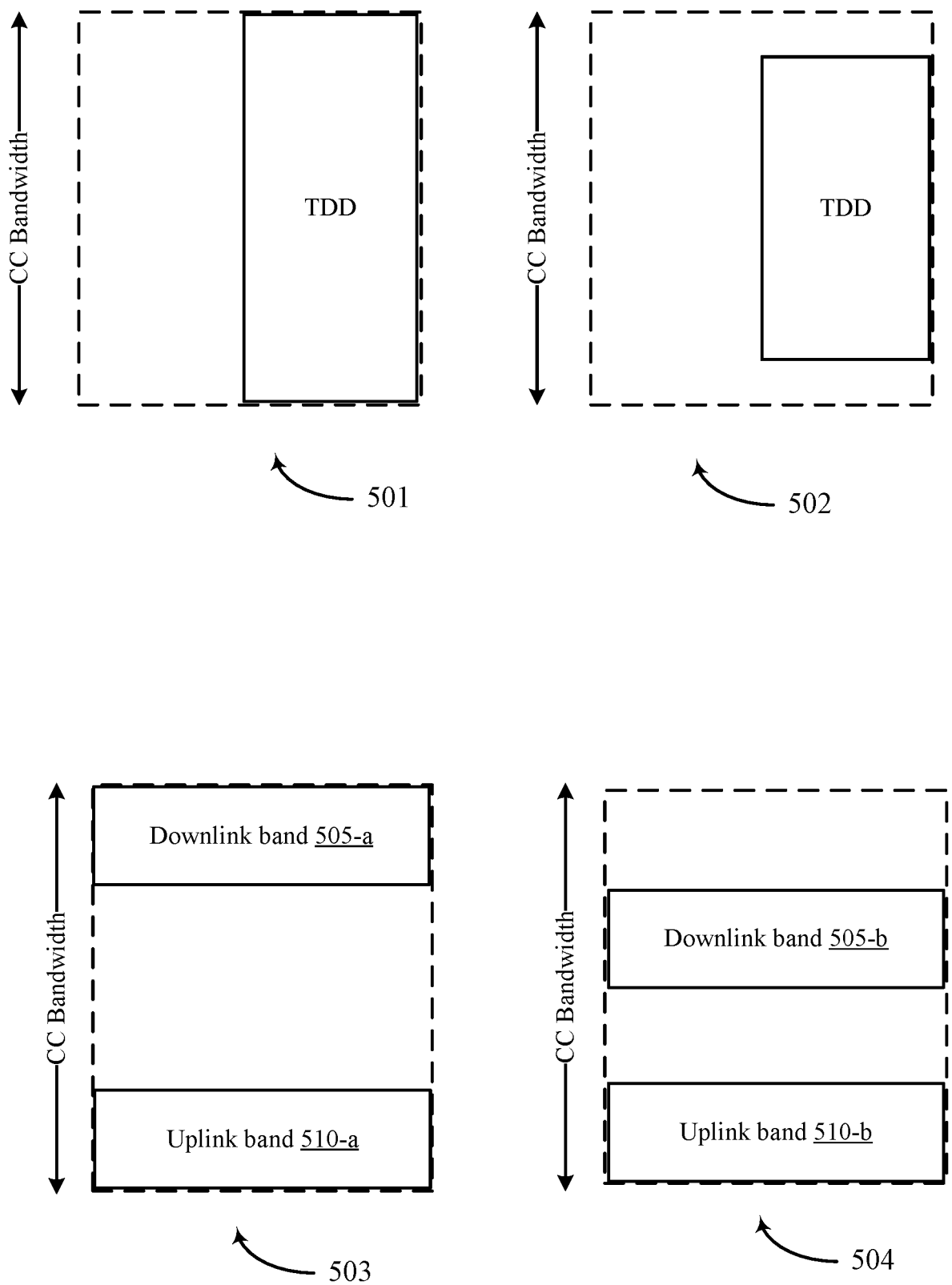
FIG. 5 illustrates an example of spectrum configurations that support dual-mode half duplex TDD and full duplex FDD capable UE in accordance with aspects of the present disclosure.

FIG. 5 illustrates an example of spectrum configurations 501, 502, 503, and 504 that support dual-mode half duplex TDD and full duplex FDD capable UE in accordance with aspects of the present disclosure. In some examples, spectrum configurations 501, 502, 503, and 504 may implement aspects of wireless communication systems 100, 201, and 202. A UE 115 may have the capability to declare multimode capability to one or more UEs 115. In this case, the UE 115 may be able to operate in either a half duplex TDD mode for some part of the CC bandwidth, the whole part of the CC bandwidth, or a full duplex FDD mode within the CC bandwidth (e.g., within the NR band).

For example, a UE 115 may declare a capability to operate in a half duplex TDD mode. This may include a case where the UE 115 is able to operate according to spectrum configuration 501, where the UE 115 may communicate either on the uplink or the downlink for the entirety of the CC bandwidth. A half duplex mode for the UE 115 may also include a capability to operate according to spectrum configuration 502, where the UE 115 is able to communicate on uplink communications or receive downlink communications for a part of the CC bandwidth.

The UE 115 may also indicate or declare that the UE 115 can operate in a half duplex FDD mode within the CC bandwidth (e.g., within the NR band). Thus the UE 115 may operate according to spectrum configurations 503 or 504, where the UE 115 can receive downlink communications in downlink frequency band 505-a and receive uplink communications in uplink frequency band 510-a. These frequency bands may be multiplexed in frequency and may overlap in time. The locations of the downlink bands an uplink bands may vary based on UE capability or other usages of the frequency band. For example, the downlink band may cover some set of frequencies in some cases, or may cover another set of frequencies in other cases. In spectrum configuration 504, downlink frequency band 505-b may cover a different set of frequencies than downlink frequency band 505-a. Uplink frequency band 510-b may cover the same set of frequencies as uplink frequency bands 510-a. Other configurations may exist and be used, where downlink frequency bands 505 and uplink frequency bands 510 cover other frequencies of the frequency bandwidth, including more or less of the CC bandwidth.

Figure 6:
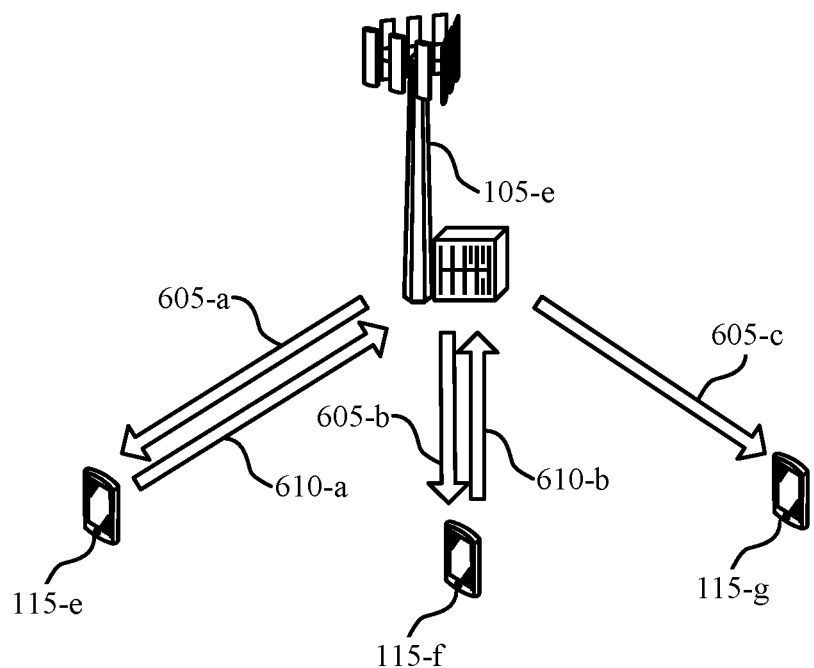
FIG. 6 illustrates an example of a wireless communication system that supports dual-mode half duplex TDD and full duplex FDD capable UE in accordance with aspects of the present disclosure.
Figure 6:
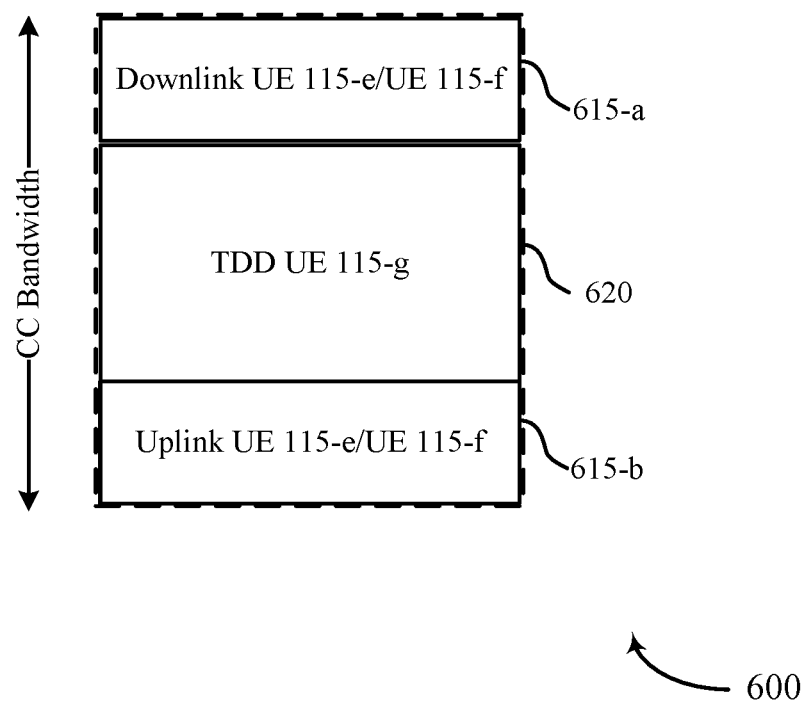

FIG. 6 illustrates an example of a wireless communications system 600 that supports dual-mode half duplex TDD and full duplex FDD capable UE in accordance with aspects of the present disclosure. In some examples, wireless communications system 600 may implement aspects of wireless communication system 100, 201, and 202. Wireless communications system 600 may illustrate a base station 105-e communicating with one or more UEs 115. Wireless communications system 600 may illustrate an example of a base station 105 communicating with multiple UEs 115 using different duplexing configurations.

UE 115-e may have a capability to communicate in a FDD configuration (e.g., a legacy FDD mode). UE 115-e may transmit an indication of this capability to base station 105-e. Base station 105-e may communicate with UE 115-e by transmitting communications over downlink channel 605-a and receiving communications from UE 115-e over uplink channel 610-a. The downlink communications with UE 115-e may be performed over legacy FDD configurations, such that downlink communications by base station 105-e to UE 115-e may be transmitted in downlink frequency channel 615-a.

UE 115-f may have a multi-mode capability. UE 115-f may transmit an indication of this multimode capability to base station 105-e. UE 115-f may be able to operate according to a dual-mode FDD configuration. In this case, UE 115-f may transmit uplink communications over channel 610-b to base station 105-e, and receive downlink transmissions from base station 105-e over downlink channel 605-b. UE 115-f may transmit uplink communications in uplink frequency channel 615-b, and UE 115-f may also receive downlink communications in frequency channel 615-a. Frequency channels 615-a and 615-b may be duplexed in frequency.

UE 115-g may have half duplex capabilities, and may be able to either receive or transmit communications, but not both. UE 115-g may also have the capability to communicate in a TDD configuration. Thus, UE 115-g may communicate this capability to base station 105-e, and base station 105-e may transmit downlink communications to UE 115-g in downlink channel 605-c. Downlink communication in downlink channel 605-c may be transmitted in TDD frequency channel 620, which may be duplexed in time with frequency channels 615-a and 615-b.

Figure 7:
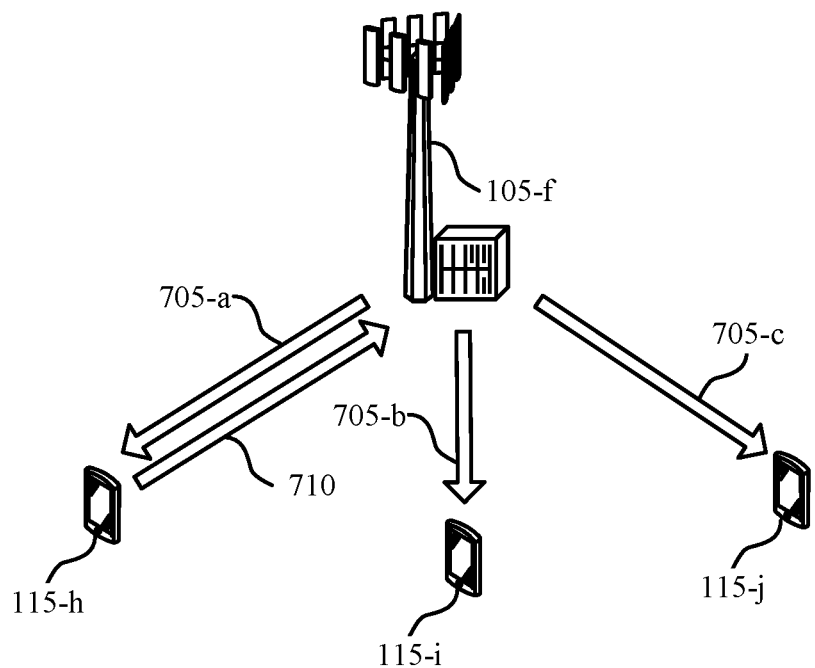
FIG. 7 illustrates an example of a wireless communications system that supports dual-mode half duplex TDD and full duplex FDD capable UE in accordance with aspects of the present disclosure.
Figure 7:
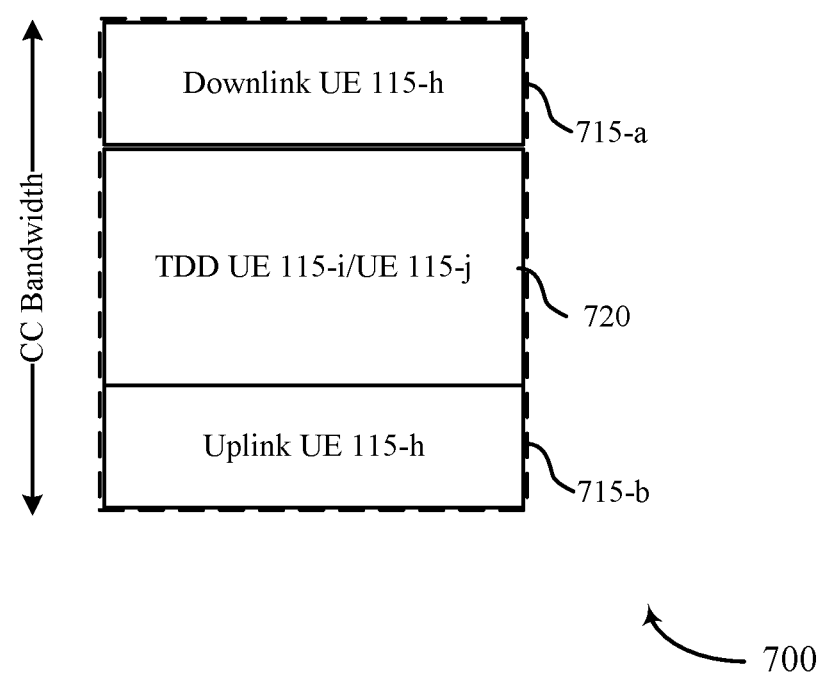

FIG. 7 illustrates an example of a wireless communications system 700 that supports dual-mode half duplex TDD and full duplex FDD capable UE in accordance with aspects of the present disclosure. In some examples, wireless communications system 700 may implement aspects of wireless communication system 100. Wireless communications system 700 may illustrate an example communications system with a different configuration from wireless communications system 600. In this case, base station 105-f may communicate with UE 115-h by transmitting communications over downlink channel 705-a and receiving communications from UE 115-h over uplink channel 710-a. The downlink communications with UE 115-h may be performed over a legacy FDD configurations, such that downlink communications by base station 105-f to UE 115-h may be transmitted in downlink frequency channel 715-a. UE 115-h may transmit uplink communications in frequency channel 715-*b*, which may be duplexed in frequency with frequency channel 715-*a*.

UE 115-*i* may have a multi-mode capability. UE 115-*i* may transmit an indication of this multimode capability to base station 105-*f* UE 115-*i* may be able to operate according to a dual-mode TDD configuration. In this case, UE 115-*i* may receive downlink transmissions from base station 105-*f* over downlink channel 705-*b*. UE 115-*i* may receive downlink communications in frequency channel 720.

UE 115-*j* may have half duplex capabilities, and may be able to either receive or transmit communications, but not both. UE 115-*j* may also have the capability to communicate in a TDD configuration. Thus, UE 115-*j* may communicate this capability to base station 105-*f*, and base station 105-*f* may transmit downlink communications to UE 115-*j* in downlink channel 705-*c*. Downlink communications in downlink channel 705-*c* may be transmitted in TDD frequency channel 720.

Figure 8:
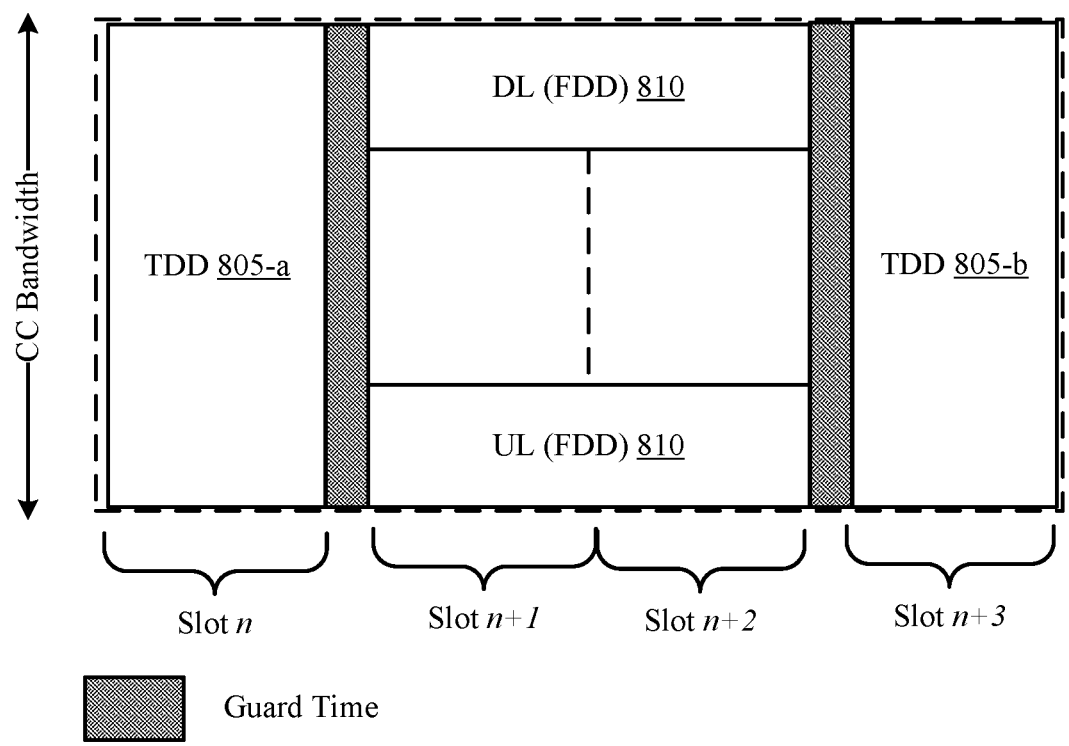
FIG. 8 illustrates an example of a spectrum configurations that supports dual-mode half duplex TDD and full duplex FDD capable UE in accordance with aspects of the present disclosure.

FIG. 8 illustrates an example of a spectrum configuration 800 that supports dual-mode half duplex TDD and full duplex FDD capable UE in accordance with aspects of the present disclosure. In some examples, spectrum configuration 800 may implement aspects of wireless communication system 100, 201, 202, 600, and 700. Another capability that a UE 115 may declare and indicate to a base station 105 is a guard time capability. The guard time capability may be the time that the UE 115 may use to switch between a TDD mode and an FDD mode. The guard time may be represented by a number of symbols, depending on the numerology for the CC in μs. The guard time may also be a fixed time (e.g., in units of μs) that the UE 115 may use to switch between TDD mode and FDD mode.

For example, a UE 115 may communicate with a base station 105 using a TDD frequency block according to TDD communication mode 805-*a*. This communication may occur during a first slot n. The UE 115 may switch to a FDD resource block 810, either based on a UE 115 requirement or based on signaling from a base station 105. The UE 115 may have previously indicated its guard time capability to the base station 105, or the UE 115 may transmit an indication of its guard time capability based on an upcoming mode switch. The UE 115 may then switch to communicating according to a FDD communication mode 810, after guard time period 815 for the UE 115 to perform the mode switch. For example, the UE 115 may communicate according to FDD communication mode 810 for two slots, n+1 and n+2. The UE 115 may also switch back to a TDD communication mode 805-*b* after another guard time period 815. The UE 115 may communicate according to TDD communication mode 805-*b* for slot n+3.

Figure 9:
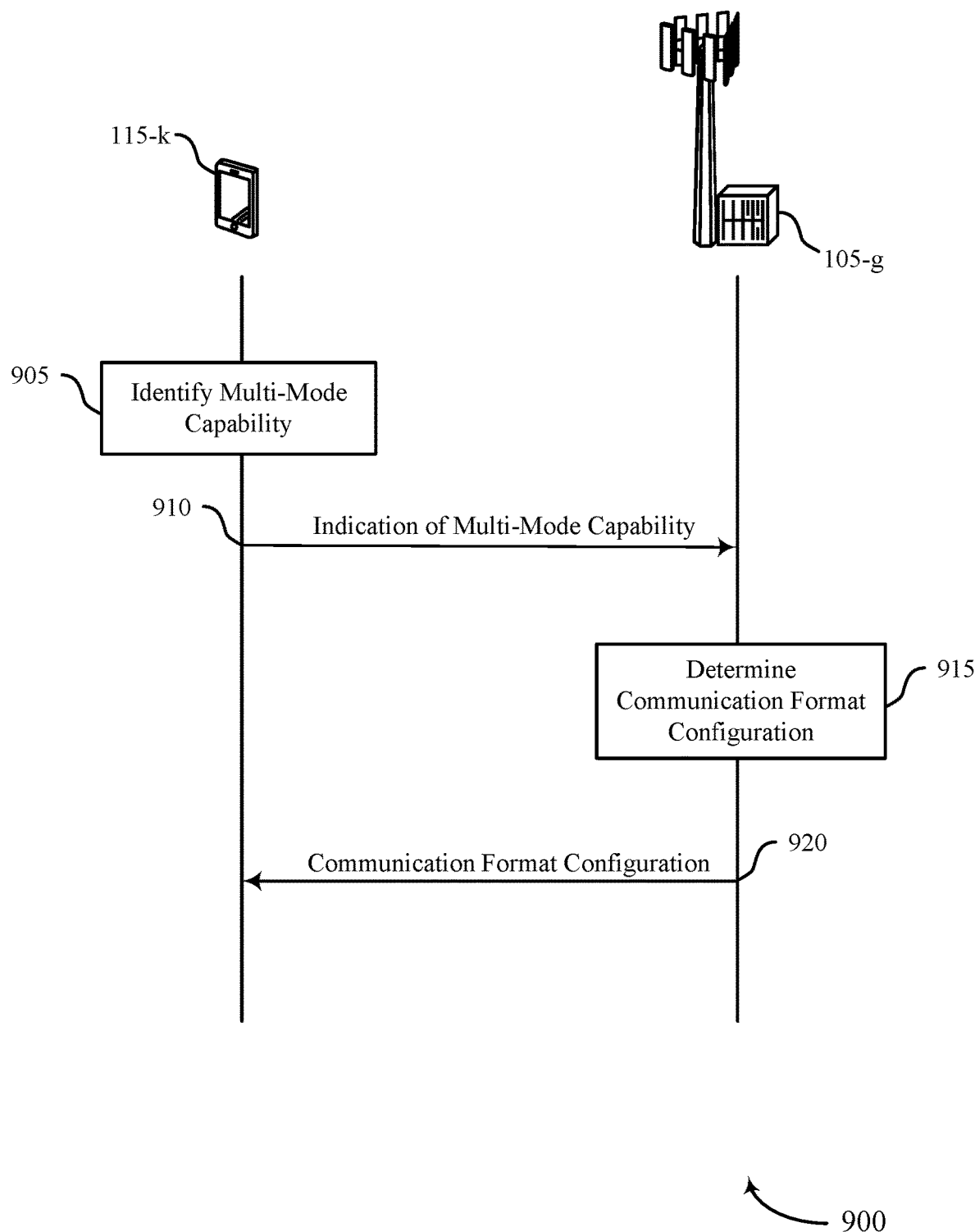
FIG. 9 illustrates an example of a process flow that supports dual-mode half duplex TDD and full duplex FDD capable UE in accordance with aspects of the present disclosure.

FIG. 9 illustrates an example of a process flow 900 that supports dual-mode half duplex TDD and full duplex FDD capable UE in accordance with aspects of the present disclosure. In some examples, process flow 900 may implement aspects of wireless communication system 100, 201, 202, 600, and 700. UE 115-*k* may communicate with base station 105-*g* according to the techniques described herein.

At 905, UE 115-*k* may identify a multi-mode capability for communications by UE 115-*k* within a frequency band such that UE 115-*k* may be capable of operating in any one of a half duplex TDD mode and a full duplex FDD mode within the frequency band. UE 115-*k* may identify that the multi-mode capability of UE 115-*k* include UE 115-*k* being capable of operating in any one of the half duplex TDD mode and the full duplex FDD mode within only a portion of the frequency band or within an entirety of the frequency band.

At 910, UE 115-*k* may transmit an indication of the multi-mode capability to base station 105-*g*. UE 115-*k* may transmit the indication to base station 105-*g* during an initial registration process in a RRC message. The initial registration process may be a random access (RACH) process.

At 915, base station 105-*g* may determine, based on the first indication, a communication format configuration for UE 115-*k* that includes a partitioning between TDD mode communications and FDD mode communications for the frequency band. In some cases, base station 105-*g* may receive the indications from a set of UEs 115. In these cases base station 105-*g* may receive a set of first indications from the set of UEs 115, and the communication format configuration may be determined based on the set of first indications.

At 920, UE 115-*g* may receive, responsive to the transmission of the indication, a communication format configuration that includes a partitioning between TDD mode and FDD mode communications for the frequency band. UE 115-*g* may receive the communication format configuration via a RRC message, where the communication format configuration may be static of semi-static. UE 115-*g* may also receive the communication format configuration via a DCI message or a MAC-CE message. In some cases, the communication format configuration may be an update for a previously received communication format configuration.

The communication format configuration may include a slot format partitioning or a subframe format partitioning or radio frame partitioning between TDD mode communications and FDD mode communications for the frequency band. The communication format configuration may include partitioning between one or more of a set of communication formats. In some cases, the set of communication formats may include a TDD format. The set of communication formats may include a TDD mixed format that include simultaneous TDD and FDD formats within the frequency band, where the frequency band is a TDD band. In some cases, the set of communication formats may include a mixed format that includes simultaneous TDD and FDD formats within the frequency band. The set of communication formats may include multiple FDD formats within the frequency band.

In some cases, receiving the communication configuration format may include receiving an operating band indication, where the operating band indication is associated with the frequency band, and where the frequency band and the operating band indication are not reserved for TDD operation only or for FDD operation only.

UE 115-*k* may also identify a switching time capability for UE 115-*k* to switch between half duplex TDD mode operations and full duplex FDD mode operations. UE 115-*k* may indicate the switching time capability to base station 105-*g*. In some cases, the communication format configuration may include a guard time between TDD mode communications and FDD mode communications that satisfies the switching time capability of UE 115-*k*. In some cases, the switching time capability of UE 115-*k* may be numerology-specific. In other cases, the switching time capability may be indicated as a fixed unit of time (e.g., in μs).

Figure 10:
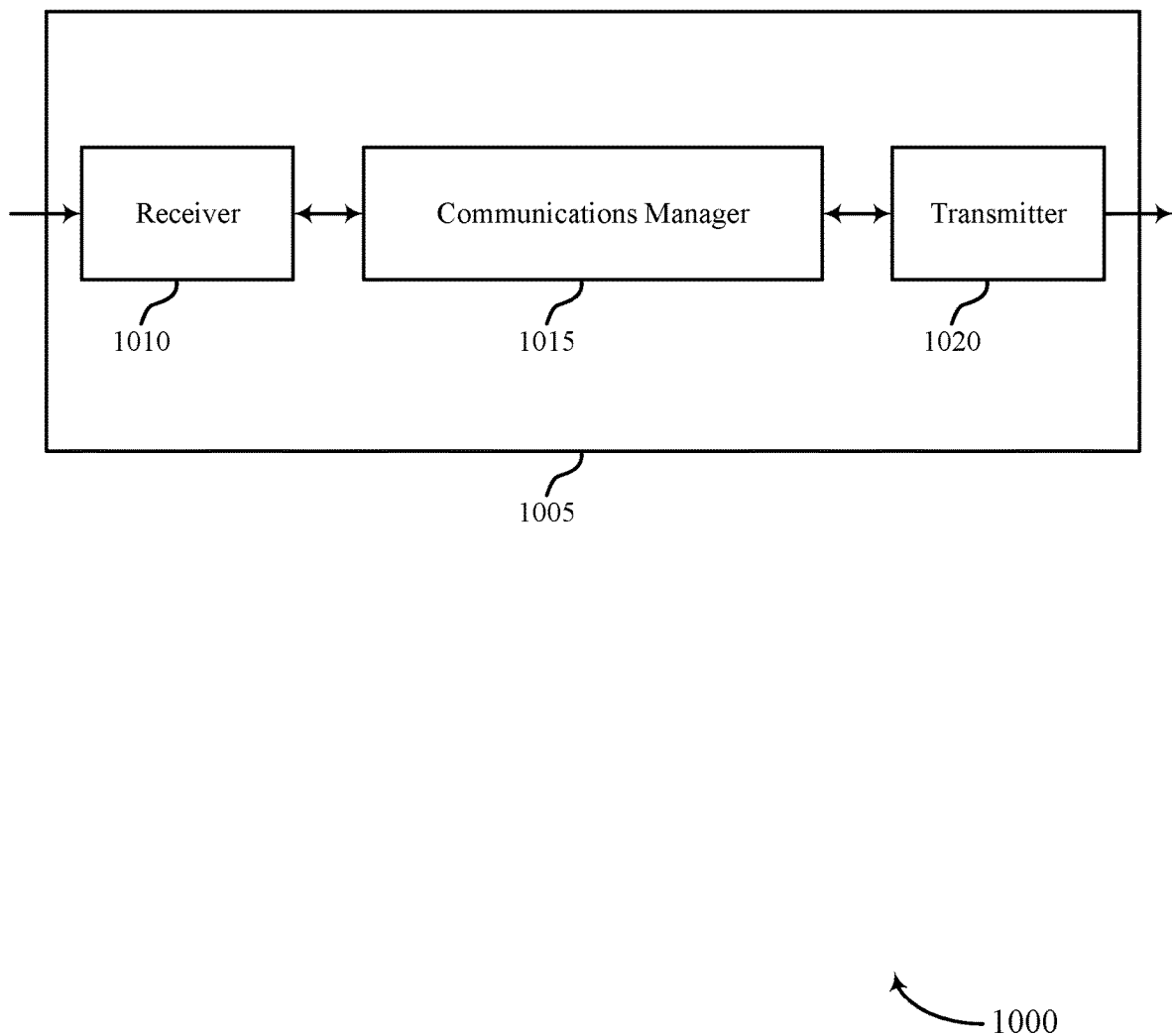
FIGS. 10 and 11 show block diagrams of devices that support dual-mode half duplex TDD and full duplex FDD capable UE in accordance with aspects of the present disclosure.

FIG. 10 shows a block diagram 1000 of a device 1005 that supports dual-mode half duplex TDD and full duplex FDD capable UE in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to dual-mode half duplex TDD and full duplex FDD capable UE, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a multi-mode capability for communications by the UE within a frequency band such that the UE is capable of operating in any one of a half duplex TDD mode and a full duplex FDD mode within the frequency band, transmit an indication of the multi-mode capability to a base station, and receive, responsive to transmission of the indication, a communication format configuration that includes a partitioning between TDD mode communications and FDD mode communications for the frequency band. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the communications manager 1015 described herein may be implemented as a chipset of a wireless modem, and the receiver 1010 and the transmitter 1020 may be implemented as sets of analog components (e.g., amplifiers, filters, phase shifters, antennas, etc.) The wireless modem may obtain and decode signals from the receiver 1010 over a receive interface, and may output signals for transmission to the transmitter 1020 over a transmit interface.

The actions performed by the communications manager 1015 as described herein may be implemented to realize one or more potential advantages. One implementation may allow a UE 115 to save power and increase battery life by increasing the efficiency of resource allocation for particular CC bandwidths. Additionally or alternatively, the UE 115 may further communicate more efficiently and experience decreased interference based on operations by communications manager 1015, including the transmission of UE capabilities to a base station 105. The decreased interference may also decrease number of retransmissions by the UE 115, thereby further saving power and increasing battery life.

Figure 11:
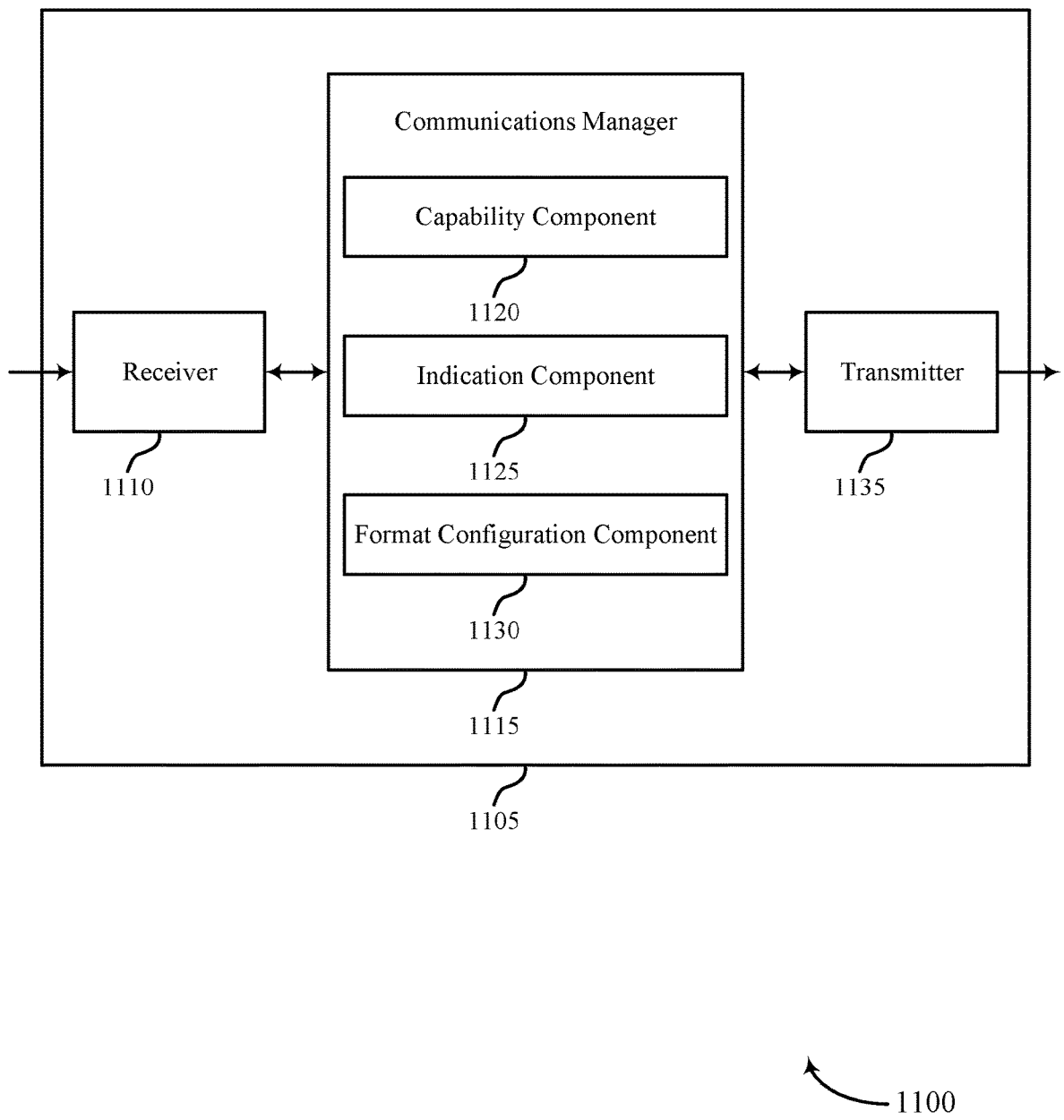

FIG. 11 shows a block diagram 1100 of a device 1105 that supports dual-mode half duplex TDD and full duplex FDD capable UE in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to dual-mode half duplex TDD and full duplex FDD capable UE, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a capability component 1120, an indication component 1125, and a format configuration component 1130. The communications manager 1115 may be an example of aspects of the communications manager 1310 described herein.

The capability component 1120 may identify a multi-mode capability for communications by the UE within a frequency band such that the UE is capable of operating in any one of a half duplex TDD mode and a full duplex FDD mode within the frequency band.

The indication component 1125 may transmit an indication of the multi-mode capability to a base station.

The format configuration component 1130 may receive, responsive to transmission of the indication, a communication format configuration that includes a partitioning between TDD mode communications and FDD mode communications for the frequency band.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

A process of a UE 115 (e.g., controlling the receiver 1110, the transmitter 1035, or the transceiver 1320 as described with reference to FIG. 13) may efficiently determine to transmit an indication of UE capabilities to a base station 105 (e.g., using transmitter 1035). The processor of the UE 115 may determine whether to transmit a multi-mode capability, including which modes the UE 115 may operate in. The processor of the UE 115 may also control the receiver 1110 to receive a communication configuration from a base station. The processor of the UE 115 may determine to communicate using, for example, transmitter 1035, according to the communication configuration. The processor of the UE 115 may therefore avoid interference and save power and increase battery life of the UE 115.

Figure 12:
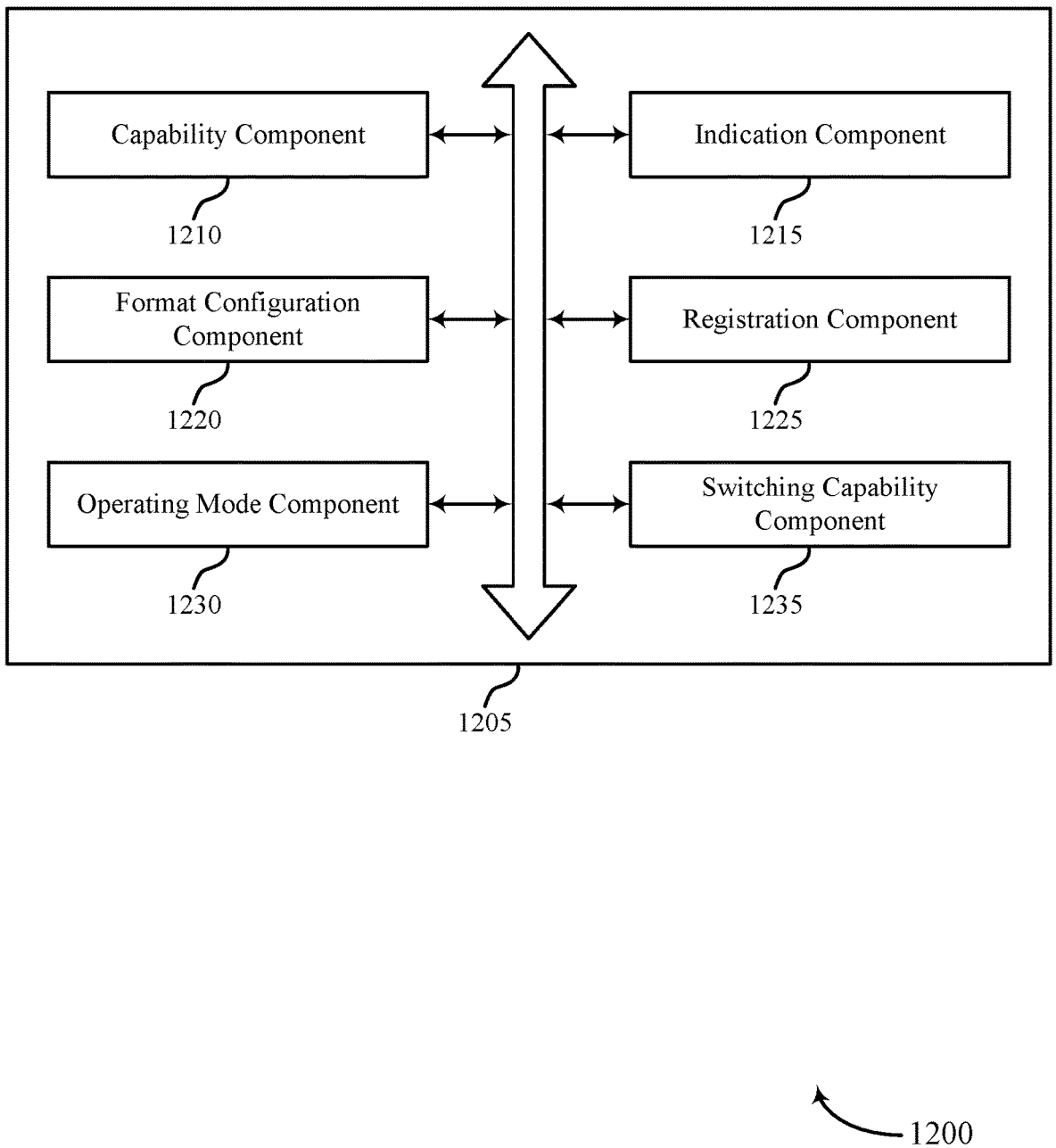
FIG. 12 shows a block diagram of a communications manager that supports dual-mode half duplex TDD and full duplex FDD capable UE in accordance with aspects of the present disclosure.

FIG. 12 shows a block diagram 1200 of a communications manager 1205 that supports dual-mode half duplex TDD and full duplex FDD capable UE in accordance with aspects of the present disclosure. The communications manager 1205 may be an example of aspects of a communications manager 1015, a communications manager 1115, or a communications manager 1310 described herein. The communications manager 1205 may include a capability component 1210, an indication component 1215, a format configuration component 1220, a registration component 1225, an operating mode component 1230, and a switching capability component 1235. Each of these modules may communicate, directly or indirectly, with one another (e.g., via one or more buses).

The capability component 1210 may identify a multi-mode capability for communications by the UE within a frequency band such that the UE is capable of operating in any one of a half duplex TDD mode and a full duplex FDD mode within the frequency band.

The indication component 1215 may transmit an indication of the multi-mode capability to a base station.

The format configuration component 1220 may receive, responsive to transmission of the indication, a communication format configuration that includes a partitioning between TDD mode communications and FDD mode communications for the frequency band.

In some examples, the format configuration component 1220 may receive the communication format configuration via a radio resource control message, where the communication format configuration is static or semi-static.

In some examples, the format configuration component 1220 may receive the communication format configuration via a downlink control information message or a medium access control (MAC) control element (CE) message.

In some examples, the format configuration component 1220 may receive an operating band indication, where the operating band indication is associated with the frequency band, and where the frequency band and the operating band indication are not reserved for TDD operation only or for FDD operation only. In some cases, the communication format configuration is an update for a previously received communication format configuration. In some cases, the communication format configuration includes a slot format partitioning or a subframe format partitioning or radio frame partitioning between TDD mode communications and FDD mode communications for the frequency band. In some cases, the communication format configuration includes partitioning between one or more of a set of communication formats. In some cases, the set of communication formats includes a TDD format. In some cases, the set of communication formats includes a TDD mixed format that includes simultaneous TDD and FDD formats within the frequency band, where the frequency band is a TDD band. In some cases, the set of communication formats includes a mixed format that includes simultaneous TDD and FDD formats within the frequency band. In some cases, the set of communication formats includes multiple FDD formats within the frequency band.

The registration component 1225 may transmit the indication to the base station during an initial registration process in a RRC message.

The operating mode component 1230 may identify that the multi-mode capability of the UE includes the UE being capable of operating in any one of the half duplex TDD mode and the full duplex FDD mode within only a portion of the frequency band or within an entirety of the frequency band.

The switching capability component 1235 may identify a switching time capability for the UE to switch between half duplex TDD mode operations and full duplex FDD mode operations. In some examples, the switching capability component 1235 may indicate the switching time capability to the base station.

In some cases, the communication format configuration includes a guard time between TDD mode communications and FDD mode communications that satisfies the switching time capability of the UE.

In some cases, the switching time capability is indicated as a number of symbols and is numerology-specific. In some cases, the switching time capability is indicated as a fixed unit of time.

Figure 13:
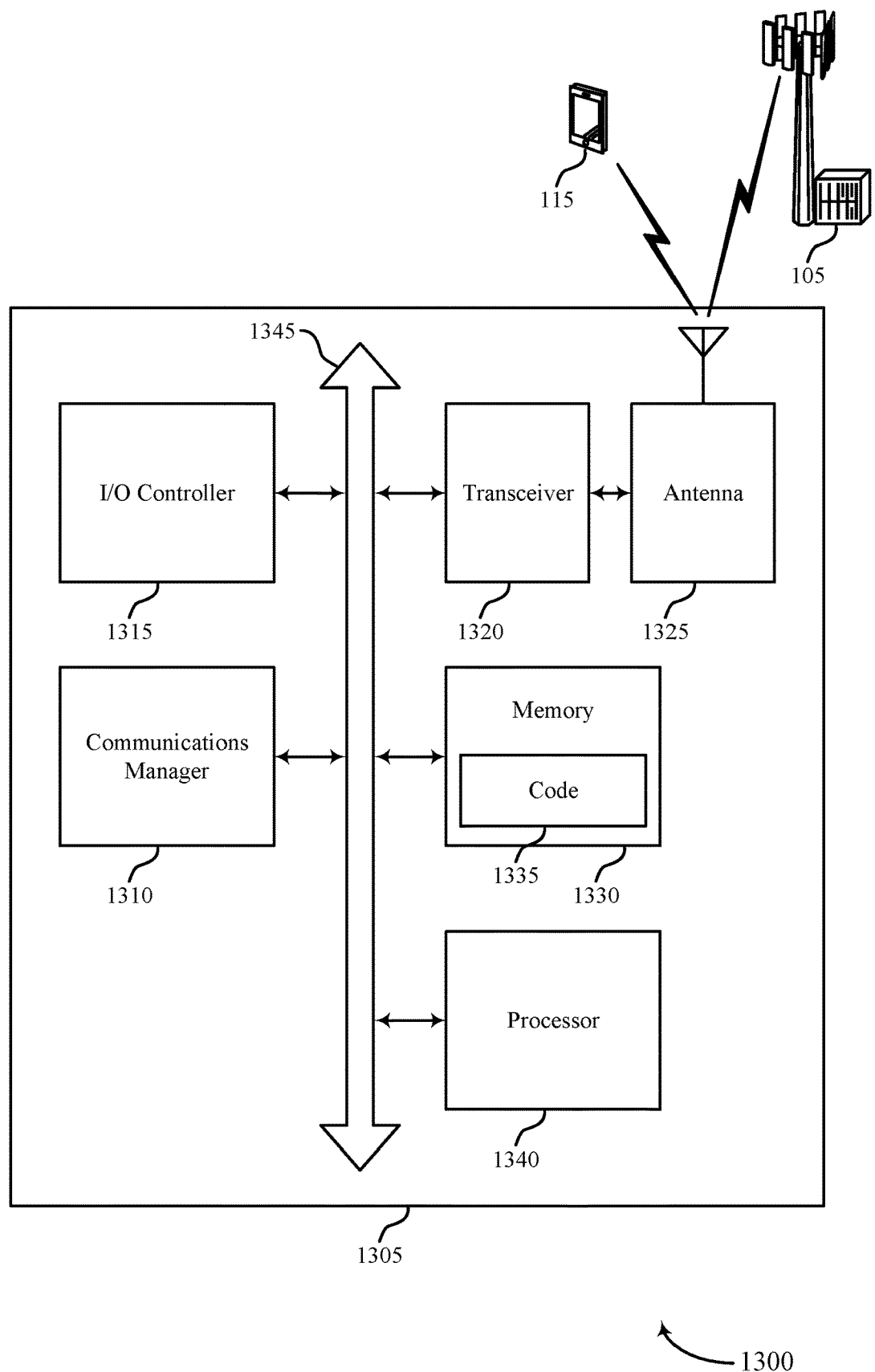
FIG. 13 shows a diagram of a system including a device that supports dual-mode half duplex TDD and full duplex FDD capable UE in accordance with aspects of the present disclosure.

FIG. 13 shows a diagram of a system 1300 including a device 1305 that supports dual-mode half duplex TDD and full duplex FDD capable UE in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify a multi-mode capability for communications by the UE within a frequency band such that the UE is capable of operating in any one of a half duplex TDD mode and a full duplex FDD mode within the frequency band, transmit an indication of the multi-mode capability to a base station, and receive, responsive to transmission of the indication, a communication format configuration that includes a partitioning between TDD mode communications and FDD mode communications for the frequency band.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random access memory (RAM) and read only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting dual-mode half duplex TDD and full duplex FDD capable UE).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
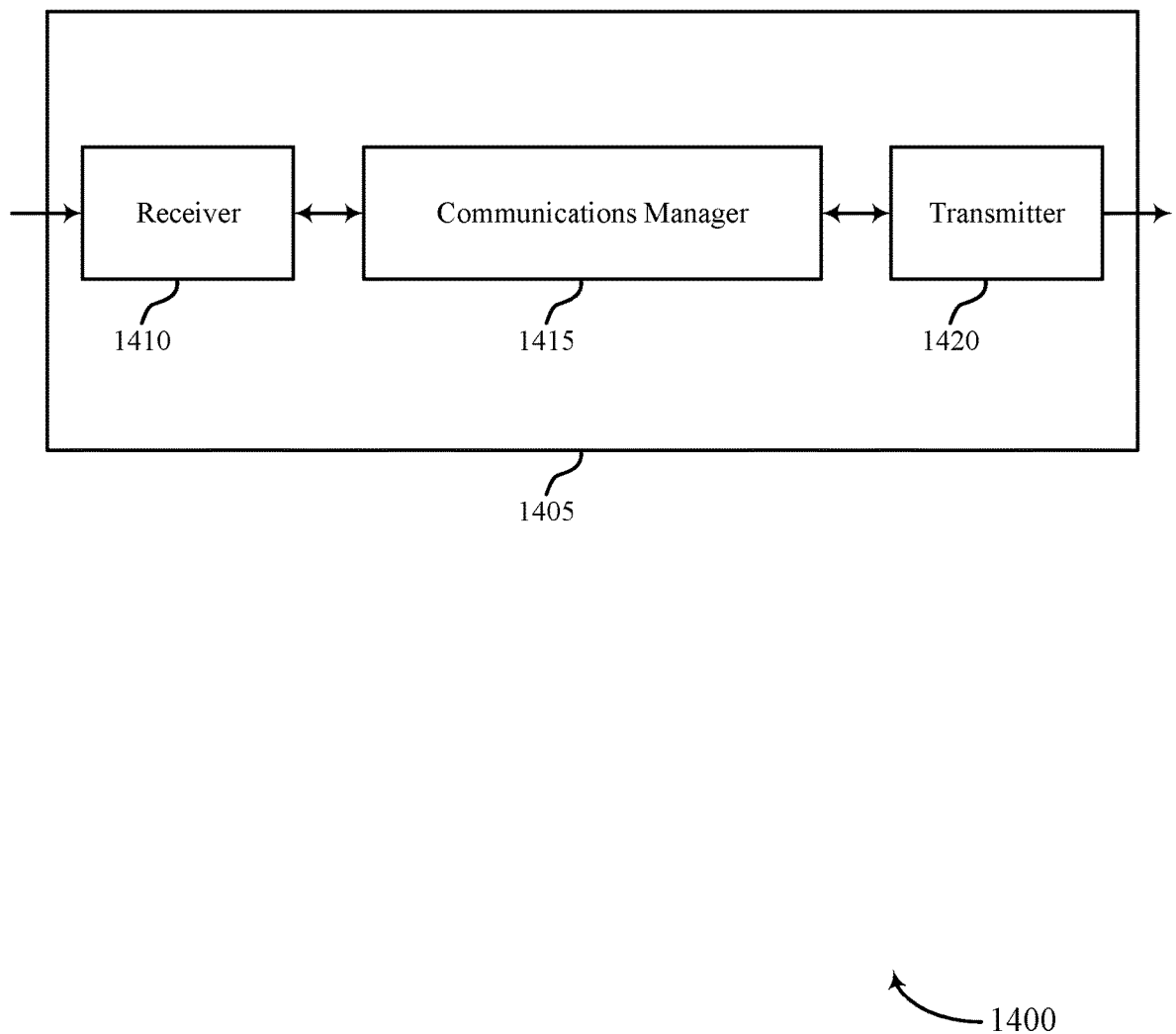
FIGS. 14 and 15 show block diagrams of devices that support dual-mode half duplex TDD and full duplex FDD capable UE in accordance with aspects of the present disclosure.

FIG. 14 shows a block diagram 1400 of a device 1405 that supports dual-mode half duplex TDD and full duplex FDD capable UE in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to dual-mode half duplex TDD and full duplex FDD capable UE, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive, from a UE, a first indication of a multi-mode capability for communications by the UE within a frequency band such that the UE is capable of operating in any one of a half duplex TDD mode and a full duplex FDD mode within the frequency band, determine, based on the first indication, a communication format configuration for the UE that includes a partitioning between TDD mode communications and FDD mode communications for the frequency band, and transmit to the UE a second indication which is indicative of the communication format configuration to be used by the UE in communicating with the base station. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
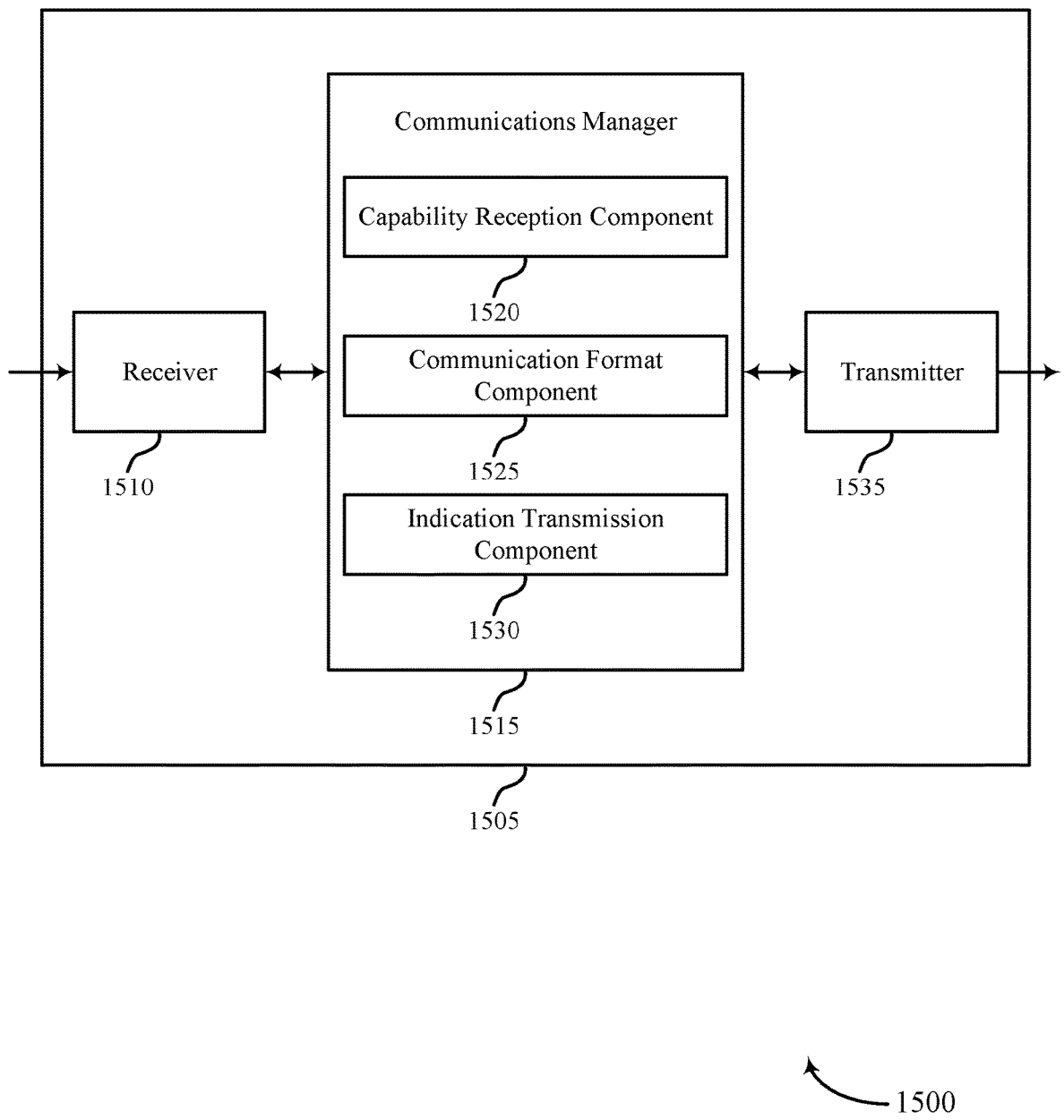

FIG. 15 shows a block diagram 1500 of a device 1505 that supports dual-mode half duplex TDD and full duplex FDD capable UE in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to dual-mode half duplex TDD and full duplex FDD capable UE, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a capability reception component 1520, a communication format component 1525, and an indication transmission component 1530. The communications manager 1515 may be an example of aspects of the communications manager 1710 described herein.

The capability reception component 1520 may receive, from a UE, a first indication of a multi-mode capability for communications by the UE within a frequency band such that the UE is capable of operating in any one of a half duplex TDD mode and a full duplex FDD mode within the frequency band.

The communication format component 1525 may determine, based on the first indication, a communication format configuration for the UE that includes a partitioning between TDD mode communications and FDD mode communications for the frequency band.

The indication transmission component 1530 may transmit to the UE a second indication which is indicative of the communication format configuration to be used by the UE in communicating with the base station.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
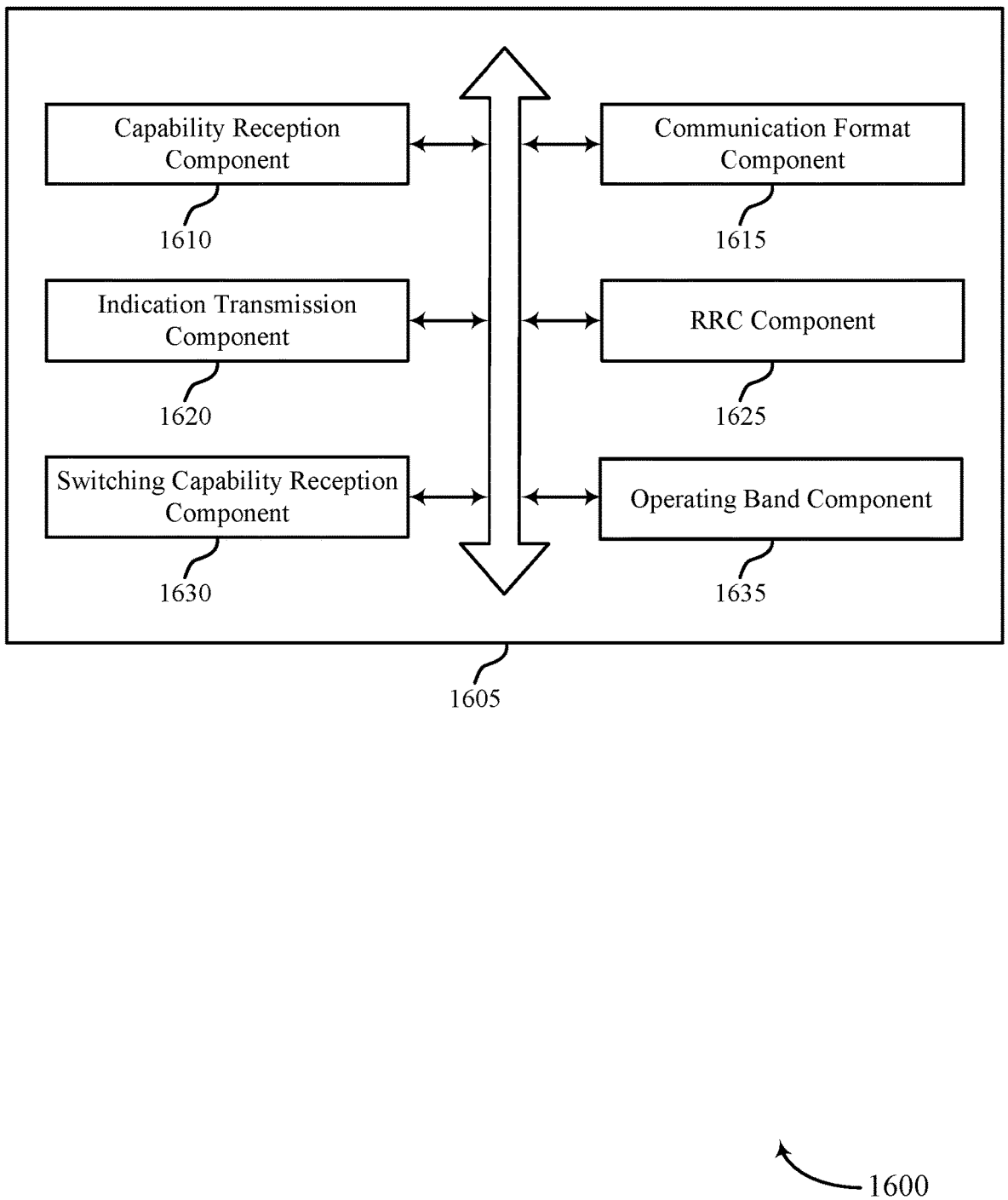
FIG. 16 shows a block diagram of a communications manager that supports dual-mode half duplex TDD and full duplex FDD capable UE in accordance with aspects of the present disclosure.

FIG. 16 shows a block diagram 1600 of a communications manager 1605 that supports dual-mode half duplex TDD and full duplex FDD capable UE in accordance with aspects of the present disclosure. The communications manager 1605 may be an example of aspects of a communications manager 1415, a communications manager 1515, or a communications manager 1710 described herein. The communications manager 1605 may include a capability reception component 1610, a communication format component 1615, an indication transmission component 1620, a RRC component 1625, a switching capability reception component 1630, and an operating band component 1635. Each of these modules may communicate, directly or indirectly, with one another (e.g., via one or more buses).

The capability reception component 1610 may receive, from a UE, a first indication of a multi-mode capability for communications by the UE within a frequency band such that the UE is capable of operating in any one of a half duplex TDD mode and a full duplex FDD mode within the frequency band.

In some examples, the capability reception component 1610 may receive a set of first indications from the set of UEs, where the communication format configuration is determined based on the set of first indications.

The communication format component 1615 may determine, based on the first indication, a communication format configuration for the UE that includes a partitioning between TDD mode communications and FDD mode communications for the frequency band.

In some cases, the communication format configuration includes a slot format partitioning or a subframe format partitioning or radio frame partitioning between TDD mode communications and FDD mode communications for the frequency band. In some cases, the communication format configuration includes partitioning between one or more of a set of communication formats. In some cases, the set of communication formats includes a TDD format. In some cases, the set of communication formats includes a TDD mixed format that includes simultaneous TDD and FDD formats within the frequency band, where the frequency band is a TDD band. In some cases, the set of communication formats includes a mixed format that includes simultaneous TDD and FDD formats within the frequency band. In some cases, the set of communication formats includes multiple FDD formats within the frequency band.

The indication transmission component 1620 may transmit to the UE a second indication which is indicative of the communication format configuration to be used by the UE in communicating with the base station.

In some examples, the indication transmission component 1620 may transmit the second indication via a downlink control information message or a medium access control (MAC) control element (CE) message.

In some cases, the communication format configuration is an update for a previously transmitted communication format configuration.

The RRC component 1625 may receive the first indication from the UE during an initial registration process in a RRC message. In some examples, the RRC component 1625 may transmit the second indication via a radio resource control message, where the communication format configuration is static or semi-static.

The switching capability reception component 1630 may receive, from the UE, a switching time capability for the UE to switch between half duplex TDD mode operations and full duplex FDD mode operations, where the communication format configuration is determined based on the switching time capability of the UE.

In some cases, the communication format configuration includes a guard time between TDD mode communications and FDD mode communications that satisfies the switching time capability of the UE. In some cases, the switching time capability is indicated as a number of symbols and is numerology-specific. In some cases, the switching time capability is indicated as a fixed unit of time.

The operating band component 1635 may transmit an operating band indication, where the operating band indication is associated with the frequency band, and where the frequency band and the operating band indication are not reserved for TDD operation only or for FDD operation only.

Figure 17:
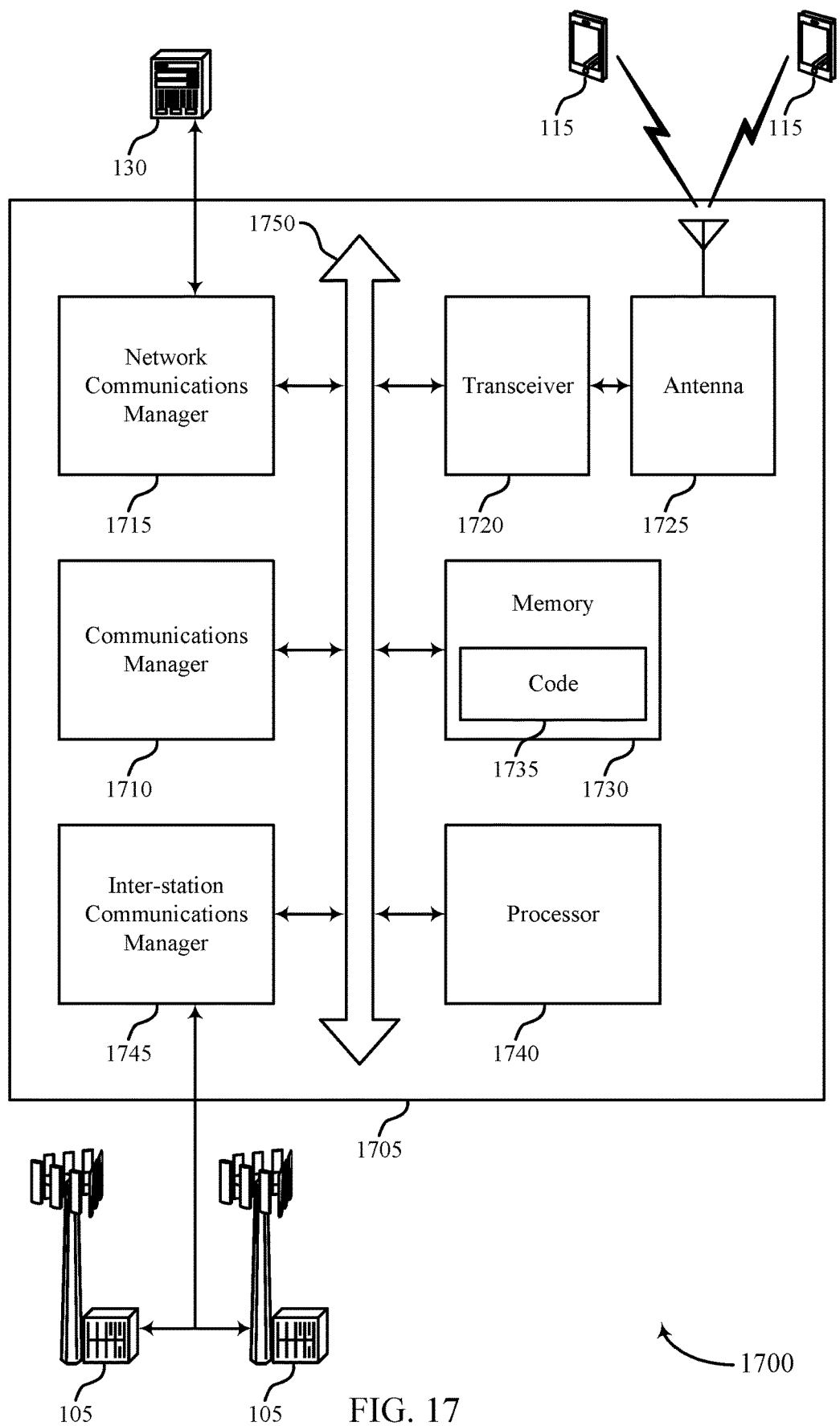
FIG. 17 shows a diagram of a system including a device that supports dual-mode half duplex TDD and full duplex FDD capable UE in accordance with aspects of the present disclosure.

FIG. 17 shows a diagram of a system 1700 including a device 1705 that supports dual-mode half duplex TDD and full duplex FDD capable UE in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may receive, from a UE, a first indication of a multi-mode capability for communications by the UE within a frequency band such that the UE is capable of operating in any one of a half duplex TDD mode and a full duplex FDD mode within the frequency band, determine, based on the first indication, a communication format configuration for the UE that includes a partitioning between TDD mode communications and FDD mode communications for the frequency band, and transmit to the UE a second indication which is indicative of the communication format configuration to be used by the UE in communicating with the base station.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting dual-mode half duplex TDD and full duplex FDD capable UE).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
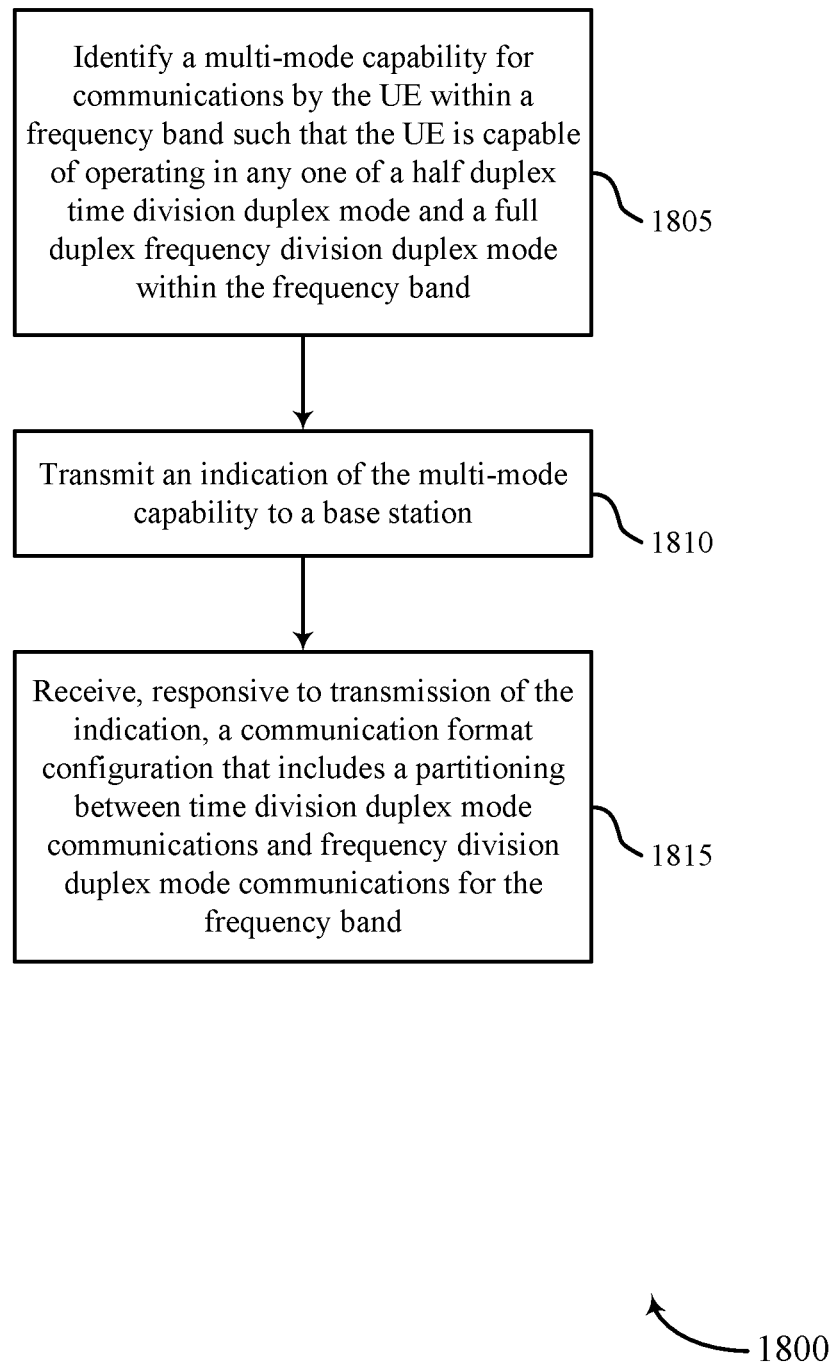
FIGS. 18 through 21 show flowcharts illustrating methods that support dual-mode half duplex TDD and full duplex FDD capable UE in accordance with aspects of the present disclosure.

FIG. 18 shows a flowchart illustrating a method 1800 that supports dual-mode half duplex TDD and full duplex FDD capable UE in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify a multi-mode capability for communications by the UE within a frequency band such that the UE is capable of operating in any one of a half duplex TDD mode and a full duplex FDD mode within the frequency band. The operations of 1805 may be performed according to the methods described herein. In some examples, aspects of the operations of 1805 may be performed by a capability component as described with reference to FIGS. 10 through 13.

At 1810, the UE may transmit an indication of the multi-mode capability to a base station. The operations of 1810 may be performed according to the methods described herein. In some examples, aspects of the operations of 1810 may be performed by an indication component as described with reference to FIGS. 10 through 13.

At 1815, the UE may receive, responsive to transmission of the indication, a communication format configuration that includes a partitioning between TDD mode communications and FDD mode communications for the frequency band. The operations of 1815 may be performed according to the methods described herein. In some examples, aspects of the operations of 1815 may be performed by a format configuration component as described with reference to FIGS. 10 through 13.

Figure 19:
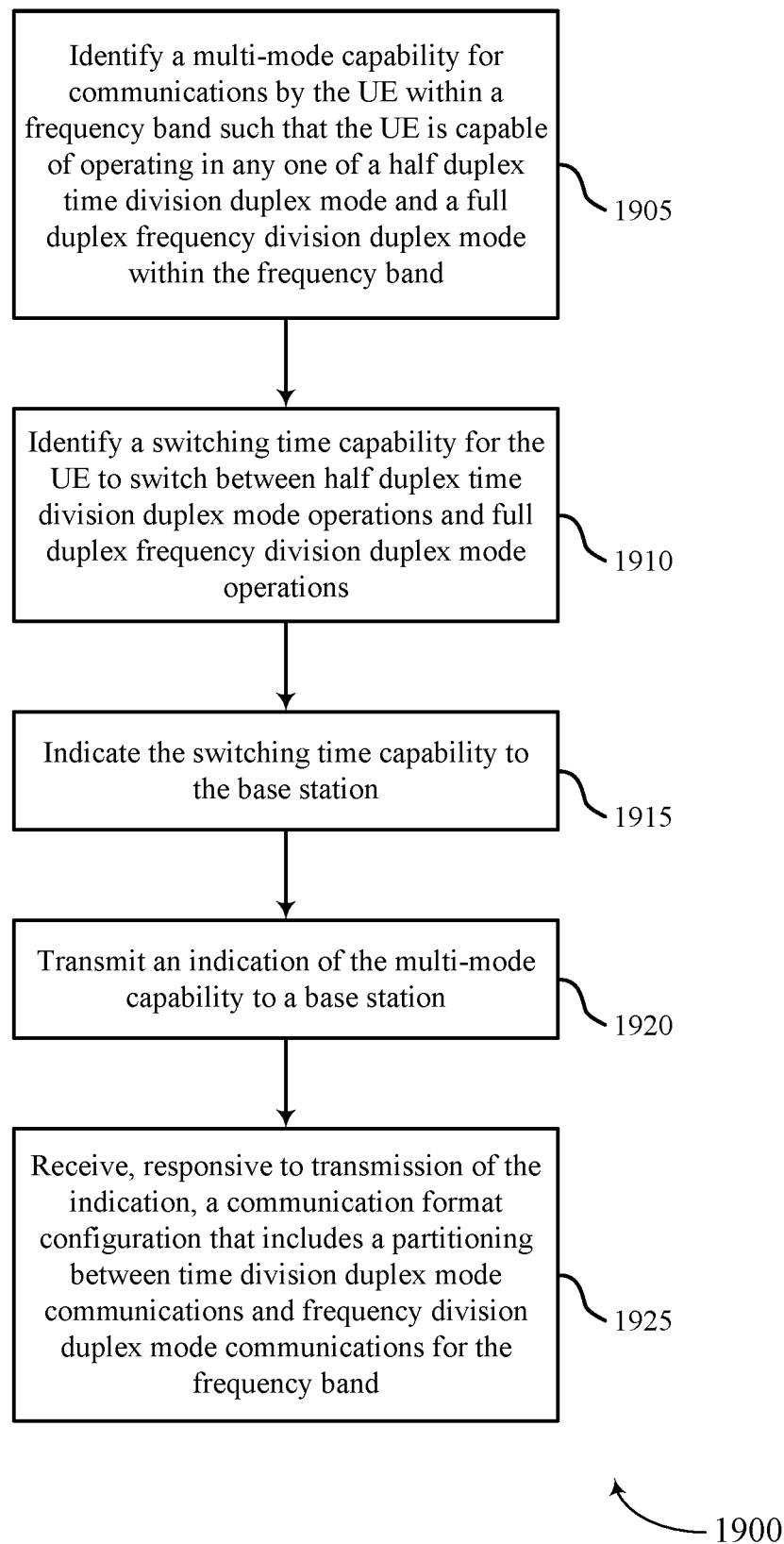

FIG. 19 shows a flowchart illustrating a method 1900 that supports dual-mode half duplex TDD and full duplex FDD capable UE in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may identify a multi-mode capability for communications by the UE within a frequency band such that the UE is capable of operating in any one of a half duplex TDD mode and a full duplex FDD mode within the frequency band. The operations of 1905 may be performed according to the methods described herein. In some examples, aspects of the operations of 1905 may be performed by a capability component as described with reference to FIGS. 10 through 13.

At 1910, the UE may identify a switching time capability for the UE to switch between half duplex TDD mode operations and full duplex FDD mode operations. The operations of 1910 may be performed according to the methods described herein. In some examples, aspects of the operations of 1910 may be performed by a switching capability component as described with reference to FIGS. 10 through 13.

At 1915, the UE may indicate the switching time capability to the base station. The operations of 1915 may be performed according to the methods described herein. In some examples, aspects of the operations of 1915 may be performed by a switching capability component as described with reference to FIGS. 10 through 13.

At 1920, the UE may transmit an indication of the multi-mode capability to a base station. The operations of 1920 may be performed according to the methods described herein. In some examples, aspects of the operations of 1920 may be performed by an indication component as described with reference to FIGS. 10 through 13.

At 1925, the UE may receive, responsive to transmission of the indication, a communication format configuration that includes a partitioning between TDD mode communications and FDD mode communications for the frequency band. The operations of 1925 may be performed according to the methods described herein. In some examples, aspects of the operations of 1925 may be performed by a format configuration component as described with reference to FIGS. 10 through 13.

Figure 20:
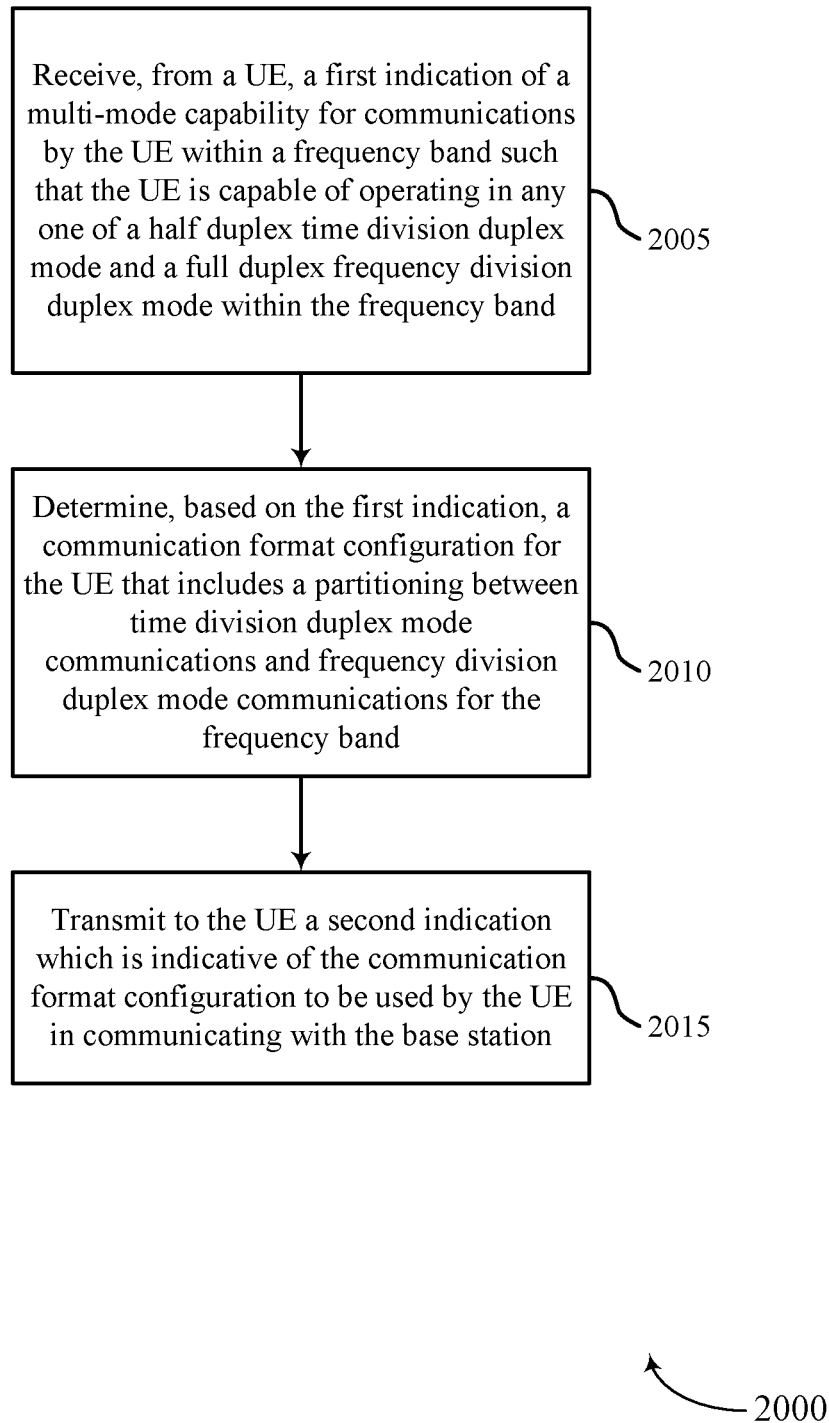

FIG. 20 shows a flowchart illustrating a method 2000 that supports dual-mode half duplex TDD and full duplex FDD capable UE in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, a first indication of a multi-mode capability for communications by the UE within a frequency band such that the UE is capable of operating in any one of a half duplex TDD mode and a full duplex FDD mode within the frequency band. The operations of 2005 may be performed according to the methods described herein. In some examples, aspects of the operations of 2005 may be performed by a capability reception component as described with reference to FIGS. 14 through 17.

At 2010, the base station may determine, based on the first indication, a communication format configuration for the UE that includes a partitioning between TDD mode communications and FDD mode communications for the frequency band. The operations of 2010 may be performed according to the methods described herein. In some examples, aspects of the operations of 2010 may be performed by a communication format component as described with reference to FIGS. 14 through 17.

At 2015, the base station may transmit to the UE a second indication which is indicative of the communication format configuration to be used by the UE in communicating with the base station. The operations of 2015 may be performed according to the methods described herein. In some examples, aspects of the operations of 2015 may be performed by an indication transmission component as described with reference to FIGS. 14 through 17.

Figure 21:
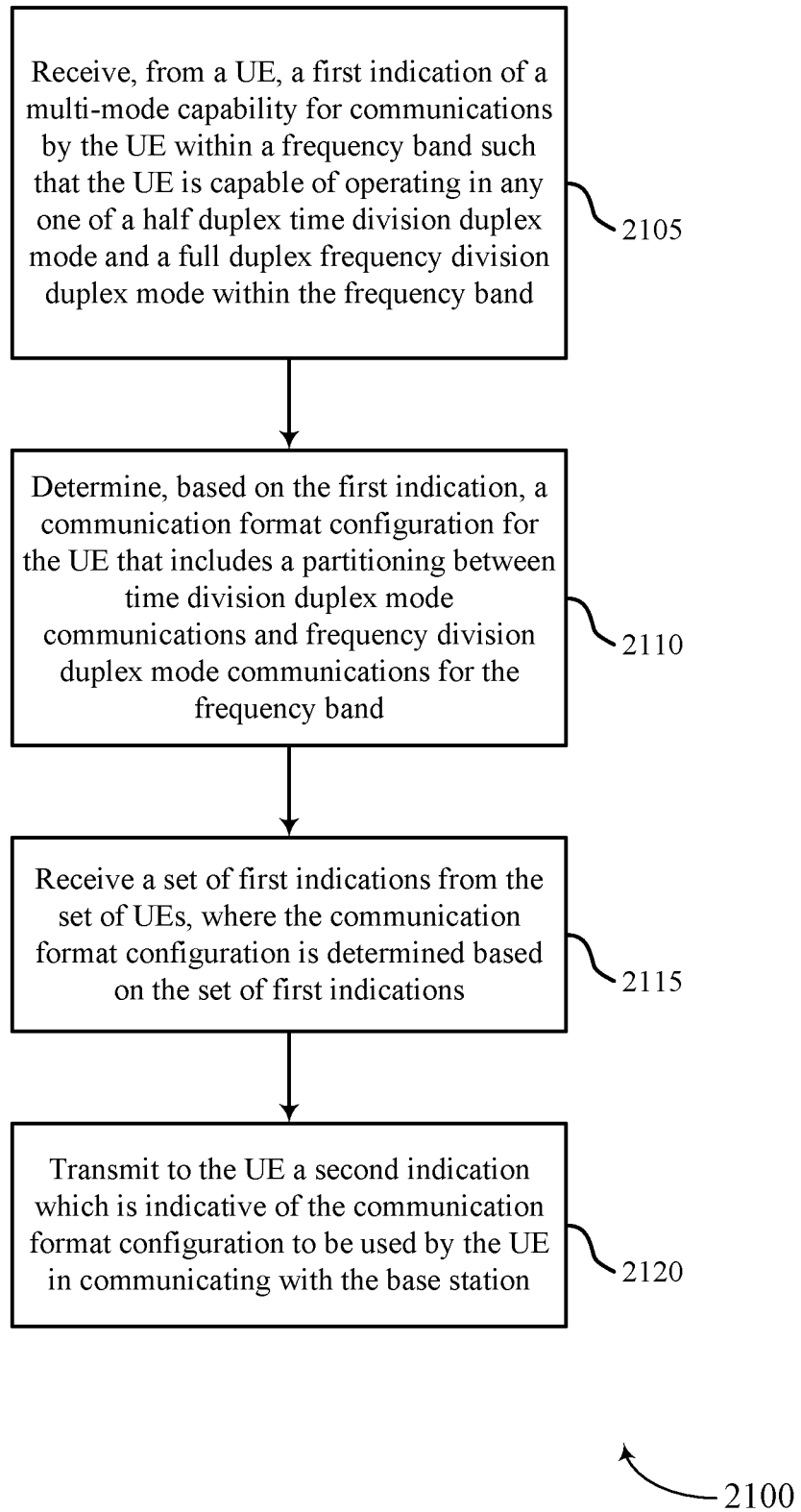

FIG. 21 shows a flowchart illustrating a method 2100 that supports dual-mode half duplex TDD and full duplex FDD capable UE in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may receive, from a UE, a first indication of a multi-mode capability for communications by the UE within a frequency band such that the UE is capable of operating in any one of a half duplex TDD mode and a full duplex FDD mode within the frequency band. The operations of 2105 may be performed according to the methods described herein. In some examples, aspects of the operations of 2105 may be performed by a capability reception component as described with reference to FIGS. 14 through 17.

At 2110, the base station may determine, based on the first indication, a communication format configuration for the UE that includes a partitioning between TDD mode communications and FDD mode communications for the frequency band. The operations of 2110 may be performed according to the methods described herein. In some examples, aspects of the operations of 2110 may be performed by a communication format component as described with reference to FIGS. 14 through 17.

At 2115, the base station may receive a set of first indications from the set of UEs, where the communication format configuration is determined based on the set of first indications. The operations of 2115 may be performed according to the methods described herein. In some examples, aspects of the operations of 2115 may be performed by a capability reception component as described with reference to FIGS. 14 through 17.

At 2120, the base station may transmit to the UE a second indication which is indicative of the communication format configuration to be used by the UE in communicating with the base station. The operations of 2120 may be performed according to the methods described herein. In some examples, aspects of the operations of 2120 may be performed by an indication transmission component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a multi-mode capability for communications by the UE within a frequency band such that the UE is capable of operating in any one of a half duplex time division duplex mode and a full duplex frequency division duplex mode within the frequency band;
    identifying a switching time capability for the UE to switch between half duplex time division duplex mode operations and full duplex frequency division duplex mode operations;
    transmitting an indication of the multi-mode capability to a network device; and
    receiving, responsive to transmission of the indication, a communication format configuration that includes a partitioning between time division duplex mode communications and frequency division duplex mode communications for the frequency band, wherein the communication format configuration includes a guard time between the time division duplex mode communications and the frequency division duplex mode communications that satisfies the switching time capability of the UE.

2. The method of claim 1, wherein transmitting the indication of the multi-mode capability comprises:
    transmitting the indication to the network device during an initial registration process in a radio resource control (RRC) message.

3. The method of claim 1, wherein receiving the communication format configuration comprises:
    receiving the communication format configuration via a radio resource control message, wherein the communication format configuration is static or semi-static.

4. The method of claim 1, wherein receiving the communication format configuration comprises:
    receiving the communication format configuration via a downlink control information message or a medium access control (MAC) control element (CE) message.

5. The method of claim 4, wherein the communication format configuration is an update for a previously received communication format configuration.

6. The method of claim 1, wherein identifying that the UE has the multi-mode capability comprises:
identifying that the multi-mode capability of the UE comprises the UE being capable of operating in any one of the half duplex time division duplex mode and the full duplex frequency division duplex mode within only a portion of the frequency band or within an entirety of the frequency band.

7. The method of claim 1, further comprising:
indicating the switching time capability to the network device.

8. The method of claim 7, wherein the switching time capability is indicated as a number of symbols and is numerology-specific.

9. The method of claim 7, wherein the switching time capability is indicated as a fixed unit of time.

10. The method of claim 1, wherein the communication format configuration includes a slot format partitioning or a subframe format or partitioning radio frame partitioning between time division duplex mode communications and frequency division duplex mode communications for the frequency band.

11. The method of claim 1, wherein the communication format configuration includes partitioning between one or more of a plurality of communication formats.

12. The method of claim 11, wherein the plurality of communication formats includes a time division duplex format.

13. The method of claim 11, wherein the plurality of communication formats includes a time division duplex mixed format that includes simultaneous time division duplex and frequency division duplex formats within the frequency band, wherein the frequency band is a time division duplex band.

14. The method of claim 11, wherein the plurality of communication formats includes a mixed format that includes simultaneous time division duplex and frequency division duplex formats within the frequency band.

15. The method of claim 11, wherein the plurality of communication formats includes multiple frequency division duplex formats within the frequency band.

16. The method of claim 1, wherein receiving the communication format configuration comprises:
receiving an operating band indication, wherein the operating band indication is associated with the frequency band, and wherein the frequency band and the operating band indication are not reserved for time division duplex operation only or for frequency division duplex operation only.

17. A method for wireless communication at a network device, comprising:
receiving, from a user equipment (UE), a first indication of a multi-mode capability for communications by the UE within a frequency band such that the UE is capable of operating in any one of a half duplex time division duplex mode and a full duplex frequency division duplex mode within the frequency band;
determining, based at least in part on the first indication, a communication format configuration for the UE that includes a partitioning between time division duplex mode communications and frequency division duplex mode communications for the frequency band; and
transmitting to the UE a second indication which is indicative of the communication format configuration to be used by the UE in communicating with the network device, wherein the communication format configuration includes a guard time between the time division duplex mode communications and the frequency division duplex mode communications that satisfies a switching time capability of the UE.

18. The method of claim 17, wherein the UE is of a plurality of UEs, the method further comprising:
receiving a plurality of first indications from the plurality of UEs, wherein the communication format configuration is determined based at least in part on the plurality of first indications.

19. The method of claim 17, wherein receiving the first indication of the multi-mode capability comprises:
receiving the first indication from the UE during an initial registration process in a radio resource control (RRC) message.

20. The method of claim 17, wherein transmitting the second indication which is indicative of the communication format configuration comprises:
transmitting the second indication via a radio resource control message, wherein the communication format configuration is static or semi-static.

21. The method of claim 17, wherein transmitting the second indication which is indicative of the communication format configuration comprises:
transmitting the second indication via a downlink control information message or a medium access control (MAC) control element (CE) message.

22. The method of claim 17, further comprising:
receiving, from the UE, a switching time capability for the UE to switch between half duplex time division duplex mode operations and full duplex frequency division duplex mode operations, wherein the communication format configuration is determined based at least in part on the switching time capability of the UE.

23. The method of claim 22, wherein the switching time capability is indicated as a number of symbols and is numerology-specific.

24. The method of claim 17, wherein the communication format configuration includes a slot format partitioning or a subframe format partitioning or radio frame partitioning between time division duplex mode communications and frequency division duplex mode communications for the frequency band.

25. The method of claim 17, wherein the communication format configuration includes partitioning between one or more of a plurality of communication formats.

26. The method of claim 17, wherein transmitting the second indication which is indicative of the communication format configuration comprises:
transmitting an operating band indication, wherein the operating band indication is associated with the frequency band, and wherein the frequency band and the operating band indication are not reserved for time division duplex operation only or for frequency division duplex operation only.

27. An apparatus for wireless communication at a user equipment (UE), comprising:
a processor,
memory coupled with the processor; and
instructions stored in the memory and executable by the processor to cause the apparatus to:
identify a multi-mode capability for communications by the UE within a frequency band such that the UE is capable of operating in any one of a half duplex time division duplex mode and a full duplex frequency division duplex mode within the frequency band;

identify a switching time capability for the UE to switch between half duplex time division duplex mode operations and full duplex frequency division duplex mode operations;

transmit an indication of the multi-mode capability to a network device; and receive, responsive to transmission of the indication, a communication format configuration that includes a partitioning between time division duplex mode communications and frequency division duplex mode communications for the frequency band, wherein the communication format configuration includes a guard time between the time division duplex mode communications and the frequency division duplex mode communications that satisfies the switching time capability of the UE.

28. An apparatus for wireless communication at a network device, comprising:

a processor, memory coupled with the processor; and instructions stored in the memory and executable by the processor to cause the apparatus to:

receive, from a user equipment (UE), a first indication of a multi-mode capability for communications by the UE within a frequency band such that the UE is capable of operating in any one of a half duplex time division duplex mode and a full duplex frequency division duplex mode within the frequency band;

determine, based at least in part on the first indication, a communication format configuration for the UE that includes a partitioning between time division duplex mode communications and frequency division duplex mode communications for the frequency band; and transmit to the UE a second indication which is indicative of the communication format configuration to be used by the UE in communicating with the network device, wherein the communication format configuration includes a guard time between the time division duplex mode communications and the frequency division duplex mode communications that satisfies a switching time capability of the UE.

* * * * *